US012651510B2

(12) United States Patent
Russ et al.

(10) Patent No.: US 12,651,510 B2
(45) Date of Patent: Jun. 9, 2026

(54) THREE-DIMENSIONAL POSITION TRACKING TO PROVIDE AUDIO BASED GAMING EXPERIENCES

(71) Applicant: IGT, Las Vegas, NV (US)

(72) Inventors: Michael Russ, Graz (AT); Lukas Angermayer, Graz (AT); Michael Brunner, Graz (AT); Julian Hofer, Pischelsdorf am Kulm (AT)

(73) Assignee: IGT, Las Vegas, NV (US)

( * ) Notice: Subject to any disclaimer, the term of this patent is extended or adjusted under 35 U.S.C. 154(b) by 224 days.

(21) Appl. No.: 18/538,725

(22) Filed: Dec. 13, 2023

(65) Prior Publication Data

US 2025/0201056 A1 Jun. 19, 2025

(51) Int. Cl.
*G07F 17/32* (2006.01)

(52) U.S. Cl.
CPC ...... *G07F 17/3225* (2013.01); *G07F 17/3209* (2013.01)

(58) Field of Classification Search
CPC .......................... G07F 17/3225; G07F 17/3209
See application file for complete search history.

(56) References Cited

U.S. PATENT DOCUMENTS

2007/0149291 A1* 6/2007 Mitchell ................. G07F 17/32 463/46
2024/0056762 A1* 2/2024 Lian ....................... H04R 5/033
2024/0205632 A1* 6/2024 Scheuregger .... G10K 11/17837

* cited by examiner

*Primary Examiner* — Werner G Garner
(74) *Attorney, Agent, or Firm* — Spencer Fane LLP; William M. Kelly

(57) ABSTRACT

Provided is a gaming device including a first speaker that provides a first portion of an audio output signal based on a first audio data signal received from an EGM, a second speaker that provides a second portion of the audio output signal based on a second audio data signal from the EGM, a first transceiver that is communicatively coupled to the EGM to determine a first distance between the first speaker and the EGM and to transmit the first audio data signal, and a second transceiver that is communicatively coupled to the EGM to determine a second distance between the second speaker and the EGM and to transmit the second audio data signal. The gaming device includes a processor circuit and a memory comprising machine-readable instructions that, when executed by the processor circuit, cause the processor circuit to modify the first portion of the audio output signal.

18 Claims, 18 Drawing Sheets

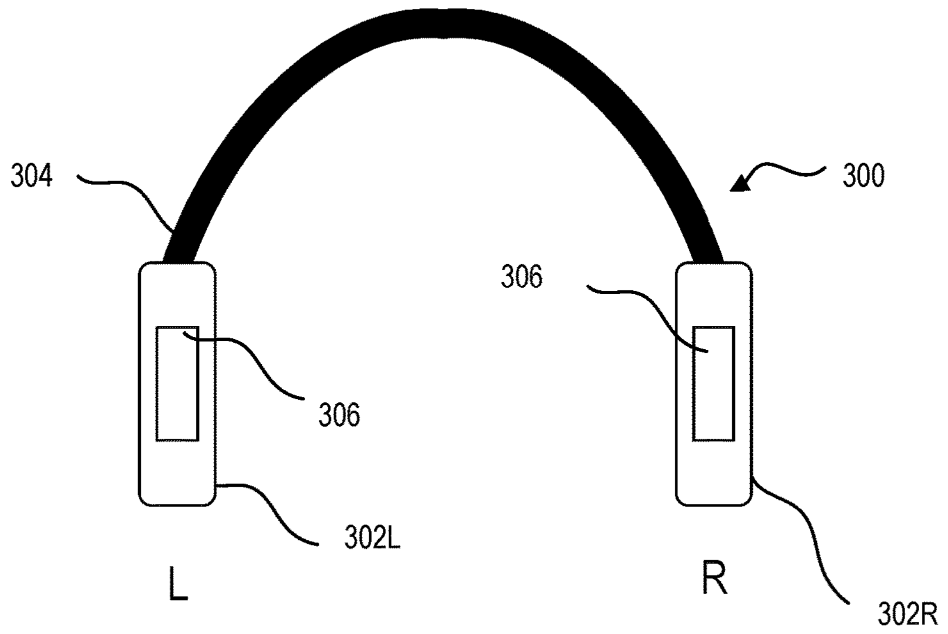
FIG. 3A
FIG. 3B
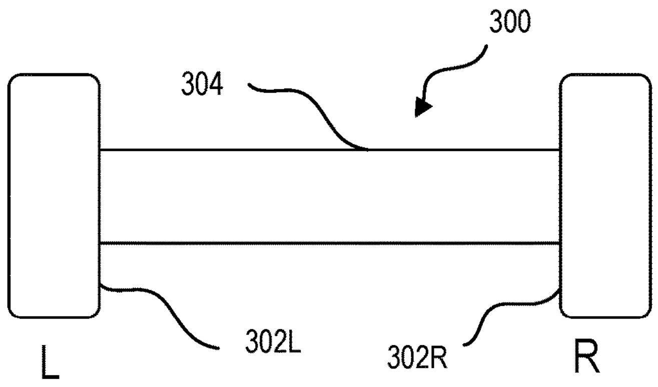
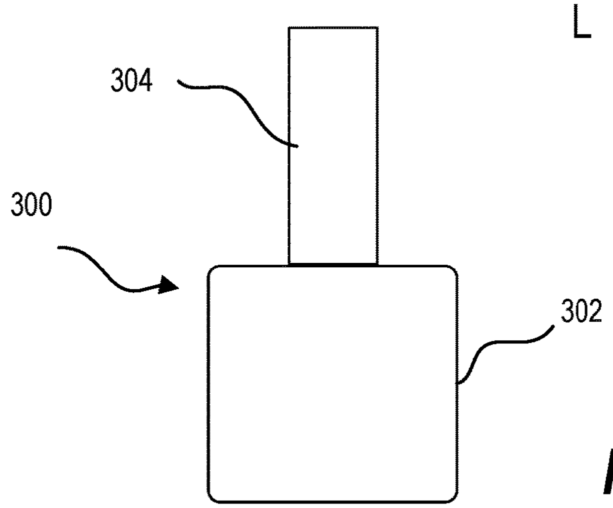
FIG. 3C

1200

1300

1400

THREE-DIMENSIONAL POSITION TRACKING TO PROVIDE AUDIO BASED GAMING EXPERIENCES

BACKGROUND

The field of disclosure herein is related to providing audio-based gaming experiences.

Audio experiences in casino machines may be limited to regular stereo and/or surround speakers that may blast game audio substantially straight forward in front of the machine. Additional sensors, such as cameras and/or depth sensors, may be used to locate the position of a player in front of the machine, and use conventional directional sound technologies to try to provide more personal and targeted audio experiences. Such experiences may require complex sensory systems and may suffer performance challenges in noisy environments such as on the casino floor. Additionally, these systems may also fail in providing personalized sound experiences as they may, to some extent, be hearable by other surrounding players. Accordingly, there is a need to provide a technical solution to the technical problem of improving audio-based gaming experience.

BRIEF SUMMARY

According to some embodiments, a system includes a processor circuit and a memory coupled to the processor circuit. The memory includes machine readable instructions that, when executed by the processor circuit cause the processor circuit to perform certain operations. A system herein includes a wearable wireless audio device that provides an audio output signal and that includes a first speaker corresponding to a first antenna and a second speaker that is spaced apart from the first speaker and that corresponds to a second antenna. The system further includes a wireless communication interface that is wirelessly coupled to a remote device antenna of a remote device and to the first antenna and the second antenna. Operations include determining, based on communications between the first antenna and the remote device antenna, first position data of the first speaker relative to the remote device. Operations may include determining, based on communications between the second antenna and the remote device antenna, second position data of the second speaker relative to the remote device. Operations may include modifying the audio output signal of the wearable wireless audio device based on the first position data and the second position data.

According to some embodiments, operations for systems, methods, and devices for facilitating embodiments may be described herein. The operations may be performed by one or more processor circuits of one or more computing devices, such as any of the computing devices described herein, for example. Some embodiments include a gaming device that includes a first speaker that provides a first portion of an audio output signal based on a first audio data signal received from an EGM. A second speaker provides a second portion of the audio output signal based on a second audio data signal from the EGM. A first transceiver is communicatively coupled to the EGM to determine a first distance between the first speaker and the EGM and to transmit the first audio data signal. A second transceiver is communicatively coupled to the EGM to determine a second distance between the second speaker and the EGM and to transmit the second audio data signal.

According to some embodiments, a method includes operations that may be performed by one or more processor circuits of one or more computing devices, such as any of the computing devices described herein, for example. The operations may include determining, by an EGM, a first position of a first antenna of a wearable wireless audio device relative to the EGM and determining, by the EGM, a second position of a second antenna of the wearable wireless audio device, the second position being different from the first position. Operations may include modifying an audio output to cause a first speaker of the wearable wireless audio device to provide first audio content and to cause a second speaker of the wearable wireless audio device to provide a second audio content that is different from the first audio content. In some embodiments, the first position includes a first distance between the first antenna and the EGM. Some embodiments provide that the second position includes a second distance between the second antenna and the EGM that is different from the first distance. Operations may further include determining a direction of sight based on a difference between the first distance and the second distance.

The gaming device may include a processor circuit and a memory including machine-readable instructions that, when executed by the processor circuit, cause the processor circuit to modify the first portion of the audio output signal and the second portion of the audio output signal based on the first distance and the second distance.

BRIEF DESCRIPTION OF SEVERAL VIEWS OF THE DRAWINGS

FIGS. 3A-3C are schematic block diagrams illustrating view of head worn audio devices 300 having front, top and side views according to some embodiments.

DETAILED DESCRIPTION

Figure 1:
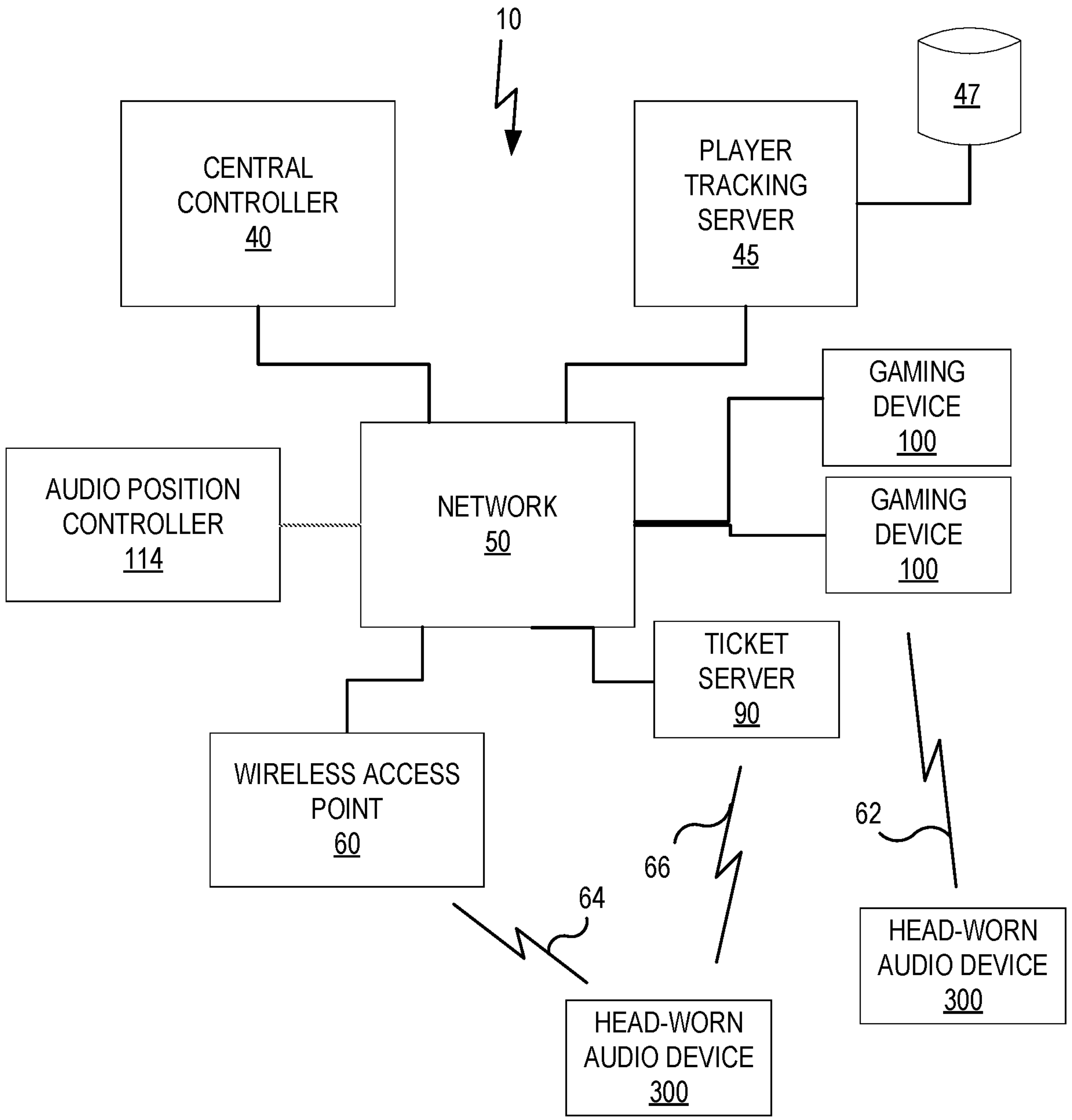
FIG. 1 is a schematic block diagram illustrating a network configuration for a plurality of gaming devices according to some embodiments.

As disclosed herein, a Bluetooth device, such as a Bluetooth 5.1 standard device, may enable accurate position and location tracking in 3D space using Angle of Arrival (AoA) and Angle of Departure (AoD) tracking without sensors other than the Bluetooth device. Some embodiments herein include implementations using Bluetooth 5.1 with one or more head-worn audio devices in the casino environment for designing novel audio-based gaming features enabled by the 3D tracking capabilities of the Bluetooth 5.1 standard. Some embodiments may create new audio experiences for casino players that are enabled by the capabilities of the head-worn audio devices and that may not be easily provided by conventional capabilities.

Although some embodiments are disclosed herein with reference to a Bluetooth standard and/or device, such embodiments are non-limiting. For example, embodiments herein may include non-Bluetooth devices that communicate using a short-range radio frequency and that use angle of arrival and/or an angle of departure data to provide location and/or position data of the non-Bluetooth device.

Some embodiments herein may enhance audio experiences even further by not requiring complex sensory systems since the position and location tracking may be performed done through the BT 5.1 capabilities. Embodiments further provide that the player may experience audio through head-worn audio devices that may provide active noise cancellation and provide improved audio isolation. Some embodiments may further provide that personal and/or personalized sound experiences may be provided.

In addition, through 3D tracking of the head-worn audio devices and the 3D position of the player's ears, some embodiments provide simulated 3D audio experiences to the player, based on their current location (e.g., in 3D space), their current direction of listening (e.g., angle to the machine), and their current distance to the gaming machine, in real-time. Thus, entirely new audio experiences can be designed and provided to the player.

Furthermore, these capabilities are not limited to just one machine. As some players prefer playing multiple gaming machines at a time, connecting their head-worn audio devices to the multiple gaming machines may enable multi-device audio experiences, including all of the features listed above.

In some embodiments, in the context of gaming machines in the venue communicating with each other, each connected gaming device may have data about the 3D positioning of the player relative to the actual gaming machine vs. the one or multiple other gaming machines. In such embodiments, audio experiences may be adjusted accordingly. For example, machine volumes may be determined as a volume of a first machine vs. a volume of a second machine, based on the players' distance to each other.

Some embodiments provide that technologies herein include Bluetooth 5.1 or newer standard to enable accurate position and location tracking in 3D space using Angle of Arrival (AoA) and/or Angle of Departure (AoD) tracking without inputs from other sensors and/or types thereof.

Some embodiments provide a head-worn audio device that may support Bluetooth 5.1 or newer. Embodiments of devices may include headphones, ear pods, and/or hearing aids, among others. In some embodiments, one or more EGMs may be connected to other EGMs, a player's mobile device and/or a Bluetooth casino system.

Some embodiments include EGMs that may be connected to one or more head-worn audio devices, to one or more other EGMs, a player's mobile device and/or a casino system, including a Bluetooth 5.1 system, among others.

In some embodiments, a player's mobile device may be connected to one or more EGMs, a player's head-worn audio device and/or a casino system, including a Bluetooth 5.1 system, among others.

Some embodiments include a connected casino system, that may include a Bluetooth 5.1 system. Such systems may include data corresponding to head-worn audio device connections that are connected, that are present, and that correspond to locations and/or positions. The data may include data corresponding to each connected device separately, data corresponding to clusters of devices, and/or aggregate data corresponding to the connected devices.

Further, conclusions from the data may trigger actions based on device locations. Some embodiments provide that the casino system data may be redundant relative to the directly connected ones of the head-worn audio devices if devices & gaming machines are interconnected directly. In some embodiments, the system may use wireless connections other than Bluetooth, such as WiFi, by using the mobile device as an intervening device. Some embodiments may include active noise cancellation that may activated and/or de-activated depending on head movement in real-time.

In some embodiments, a connection arrangement may provide that a first player is connected to first EGM and may experience 3D audio features based on the current position and/or location that is determined using a head-worn audio device.

In some embodiments, a connection arrangement may provide that a first player is connected to more than one more EGMs and is playing the multiple EGMs simultaneously. In some embodiments the first player may experience 3D audio features from each of the multiple EGMs. Some embodiments include dynamically depending on in-game events on each EGM and on their current position relative to each of the EGMs.

In such embodiments, the EGMs may be directly connected to each other and share information directly with each other, including which audio content they are transmitting, what the distance is to the player and/or which volume they are transmitting, among others. In this manner a multi-game audio experience may be provided for the player. Such embodiments may provide that each EGM may report its information to a casino system, such as a Bluetooth casino system. In such embodiments, the casino system may process the different inputs and provide a resulting output back to each of the EGMs, which may then forward it to the head-worn audio device. In such other embodiments, instead of the casino system communicating with the EGMs may include the casino system talking back to the EGMs and sending the audio content directly to the audio device. In yet further embodiments, a player's mobile device may be connected to the various components (EGMs, audio device) and use mobile device as an intermediate ("man in the middle") type of connection with the casino system.

In this manner, a casino system may not be Bluetooth based and the mobile device may act as central component via Bluetooth to EGM(s) and/or audio device(s). In such embodiments, direct communication to the casino system may be eliminated via other wireless technologies, such as WiFi, among others. Some embodiments may provide that the WiFi may provide faster processing than the Bluetooth.

In some embodiments, a connection arrangement may provide that multiple players are connected one multiplayer EGM and/or a bank of EGMs. In such embodiments, both players may experience 3D audio features based on each of their current positions. Additionally, the players may experience 3D audio features from other players, depending on their current position relative to the other player's current position, and optionally relative to the EGM. Such embodiments may include splitting audio channels between a first player and a second player, identifying the relevant audio for each, track each player's 3D position, simultaneously processing the 3D audio according to the 3D position of each player, and transmit the relevant, 3D-tuned audio respectively, in real-time.

In some embodiments, a connection arrangement may provide that two or more players are connected to a single-player EGM and that both are experiencing 3D audio features based on each of their current positions. In such embodiments, processes disclosed above may be included in addition to splitting audio channels between a primary (active) player and a secondary person. A secondary person may include a person that is waiting for the machine to become free, watching the game and/or being interested in the game. In such embodiments, only relevant audio data may be transmitted for each, depending on their role.

In some embodiments, initializing connections may include manual pairing and/or connecting of a player's head-worn audio device with an EGM. In some embodiments, the connecting and/or pairing may be selected from a menu on an EGM. In some embodiments, the head-worn audio device may be connected to a mobile device, then the mobile device may be connected with an EGM and/or casino system either automatically or manually. For example, the mobile device may function as an audio routing device.

Some embodiments include automatically connecting a head-worn audio device and/or mobile device as a routing device with casino system upon a casino visit. Then, the head-worn audio device may have a connection to the EGM automatically, for example, once the player starts to play the EGM based on player tracking. Some embodiments provide that a connection may be initiated responsive to a player cashing based on a player tracking card being inserted and/or using a mobile cashless connect feature. In such embodiments, a connection may be auto-initiated using a player's head-worn audio device. The auto-initiated connection to player's head-worn audio device may know the device of the player and, through player ID, know which device to connect to. In some embodiments, a QR code or other optically displayed code and/or data, among others, may be displayed on a screen of the EGM. Such code may be scanned with mobile device to provide a connection of the head-worn audio device, routed through the mobile device, with the specific EGM and/or casino system. In some embodiments, an NFC tag may be used to connect NFC-compatible audio devices instantly.

In some embodiments, terminating a connection may be caused in response to a player cashing out a play session. For example, cashing out may terminate any Bluetooth connectivity with any machine. Some embodiments provide that cashing out may terminate any payout relevant communication. For example, a player may want to remain connected with machine regarding changes in a progressive jackpot or the like. Some embodiments provide that sensitive in-game or cash-related information from another players' gameplay may not be shared. In some embodiments provide that termination may be based on idle time.

In some embodiments, termination may be performed manually by the player, such as via the EGM and/or via the mobile device screens/settings. Manual termination may also be performed by turning off one or more of the connected devices and/or as a result of an abrupt connection status change, such as through a power interruption, among others.

In some embodiments automatic termination may be performed, such as after a specific game feature has ended. For example, in response to a secondary player joining the main player's game play just for the duration of a bonus feature, the secondary player's connection may be automatically terminated when a bonus feature that the secondary player was watching is finished. Examples may include back-betting opportunities that may terminate immediately after the underlying wager/feature is complete.

Before discussing these and other embodiments in greater detail, reference will be made to an example of a gaming system for implementing embodiments disclosed herein. In this regard, FIG. 1 illustrates a gaming system 10 including a plurality of gaming devices 100 is illustrated. As discussed above, the gaming devices 100 may be one type of a variety of different types of gaming devices, such as electronic gaming machines (EGMs), mobile gaming devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the gaming devices 100. Communications over the data communication network 50 may be encrypted for security. The central controller 40 may be any suitable server or computing device which includes at least one processing circuit and at least one memory or storage device. Each gaming device 100 may include a processing circuit that transmits and receives events, messages, commands or any other suitable data or signal between the gaming device 100 and the central controller 40. The gaming device processing circuit is operable to execute such communicated events, messages or commands in conjunction with the operation of the gaming device 100. Moreover, the processing circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processing circuits. Moreover, in some embodiments, one or more of the functions of one or more gaming device processing circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processing circuit that transmits and receives events, messages, commands or any other suitable data or signal between the ticket server 90 and the central controller 40. The ticket server 90 processing circuit may be operable to execute such communicated events, messages or commands in conjunction with the operation of the ticket server 90. Moreover, in some embodiments, one or more of the functions of one or more ticket server 90 processing circuits as disclosed herein may be performed by the central controller 40.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, a near field communications (NFC) link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

The wireless interfaces 62, 66 allow a plurality of head worn audio devices 300, to coordinate the generation and rendering location based enhanced audio features to the player. In some embodiments, the gaming system 10 includes aa audio position controller 114. The audio position controller 114 may be a computing system that communicates through the data communication network 50 with the EGMs 100 and the head worn audio devices 300 to coordinate the generation and transmission of enhanced audio experiences to one or more players using the head worn audio devices 300. The audio position controller 114 may be implemented within or separately from the central controller 40.

In some embodiments, the audio position controller 114 may coordinate the generation and/or transmission of the enhanced audio features and/or experiences. As described in more detail below, this may enable multiple players to interact with the same audio together in real time. This feature can be used to provide a shared multiplayer experience to multiple players at the same time.

Moreover, in some embodiments, audio position controller 114 may coordinate the generation and transmission of audio features to players at different physical locations, as will be described in more detail below.

The audio position controller 114 may enable a head worn audio device 300 to more quickly and accurately determine its position and/or orientation within the gaming area, and also may enable the head worn audio device 300 to assist the player in navigating the gaming area while using the head worn audio device 300.

In some embodiments, at least some processing of enhanced audio that is rendered by the head worn audio device 300 may be performed by the audio position controller 114, thereby offloading at least some processing requirements from the head worn audio devices 300.

Figure 2A:
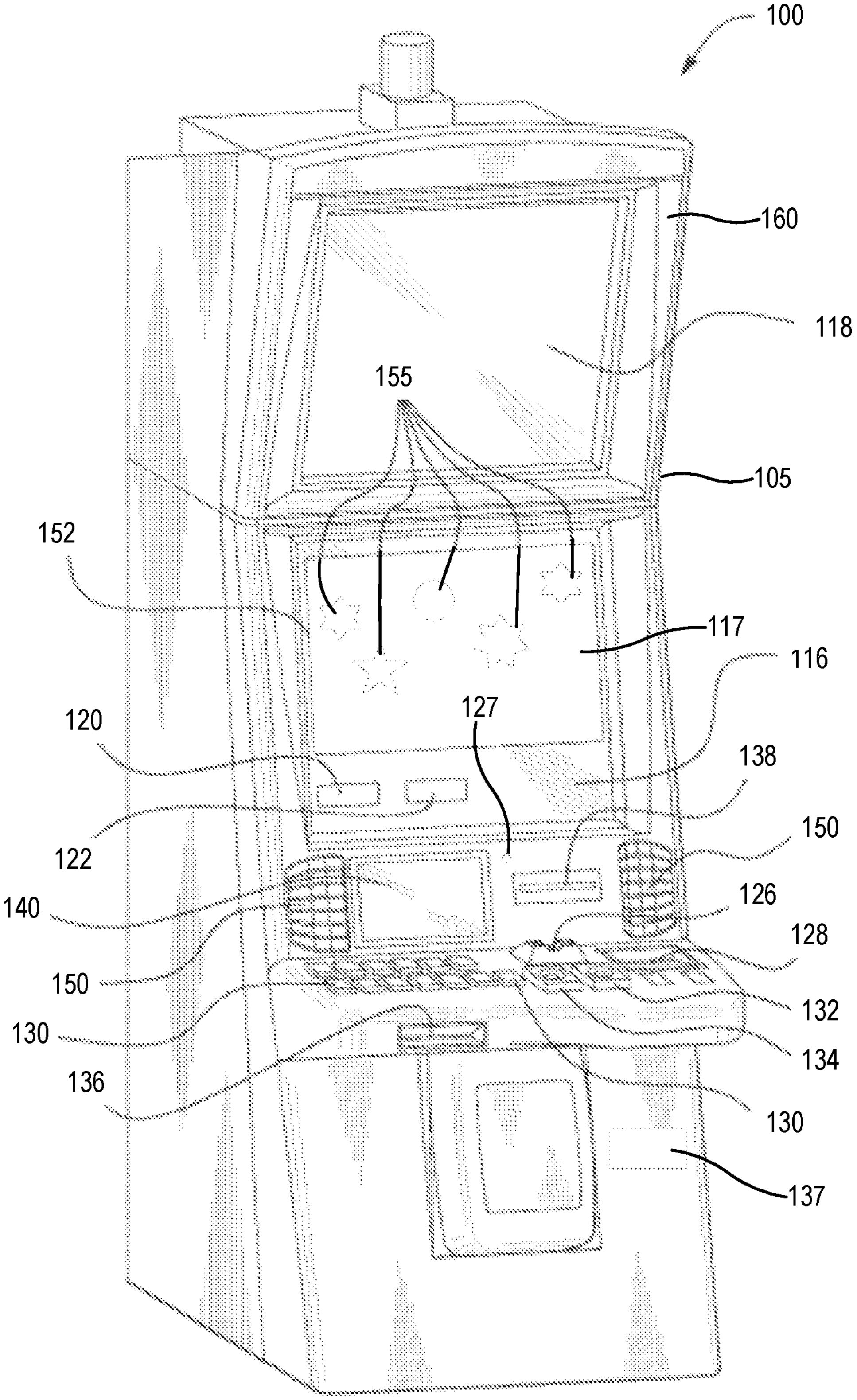
FIG. 2A is a perspective view of a gaming device that can be configured according to some embodiments.
Figure 2B:
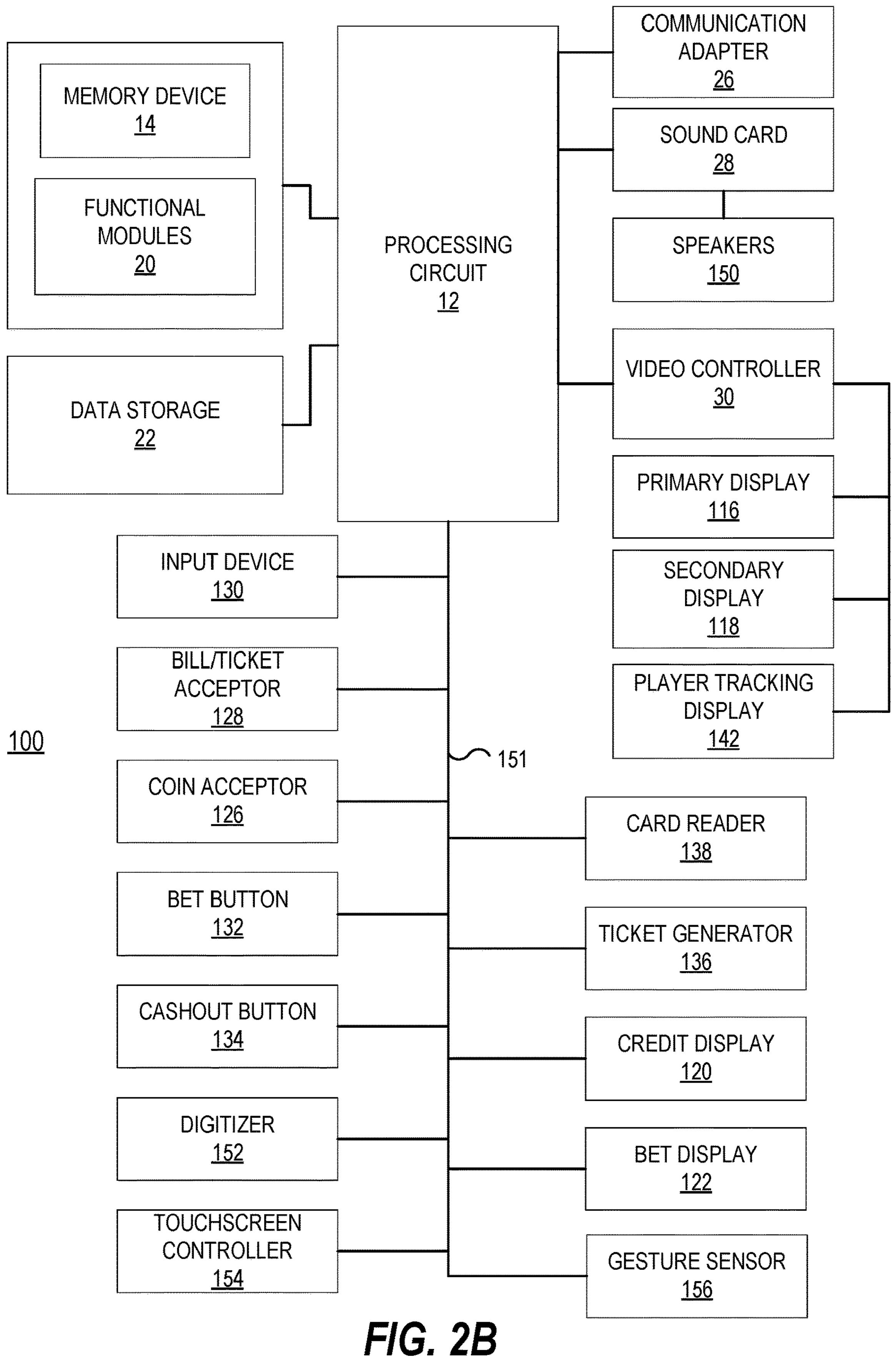
FIG. 2B is a schematic block diagram illustrating an electronic configuration for a gaming device according to some embodiments.
Figure 2C:
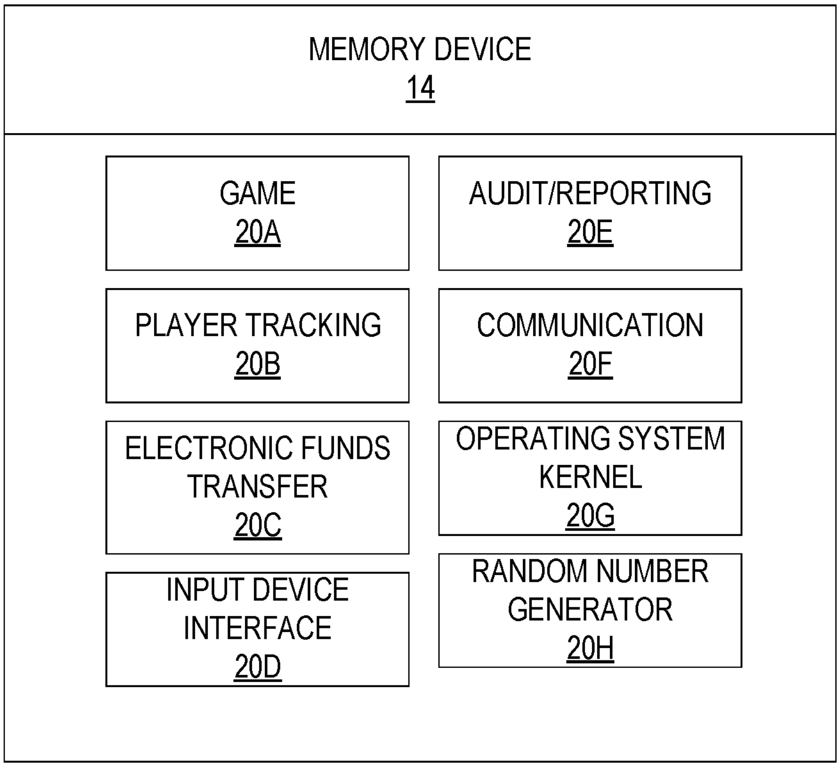
FIG. 2C is a schematic block diagram that illustrates various functional modules of a gaming device according to some embodiments.

Embodiments herein may include different types of gaming devices. One example of a gaming device includes a gaming device 100 that can use gesture and/or touch-based inputs according to various embodiments is illustrated in FIGS. 2A, 2B, and 2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A to 2C are provided as examples for illustrative purposes only. It will be appreciated that gaming devices may come in many different shapes, sizes, layouts, form factors, and configurations, and with varying numbers and types of input and output devices, and that embodiments are not limited to the particular gaming device structures described herein.

Gaming devices 100 typically include a number of standard features, many of which are illustrated in FIGS. 2A and 2B. For example, referring to FIG. 2A, a gaming device 100 (which is an EGM 160 in this embodiment) may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as gesture sensors 156 for gesture input devices, and/or a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above-described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processing circuit 12 or directly from a memory device 14 and displays the video data on the display screen. The credit display 120 and the bet display 122 are typically implemented as simple liquid crystal display (LCD) or light emitting diode (LED) displays that display a number of credits available for wagering and a number of credits being wagered on a particular game. Accordingly, the credit display 120 and the bet display 122 may be driven directly by the processing circuit 12. In some embodiments however, the credit display 120 and/or the bet display 122 may be driven by the video controller 30.

Referring again to FIG. 2A, the display devices 116, 118, 140 may include, without limitation: a cathode ray tube, a plasma display, an LCD, a display based on LEDs, a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touchscreen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket dispenser 136, a bill/ticket acceptor 128, and a coin acceptor 126 that allows the player to deposit coins into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processing circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processing circuit 12 that controls operations of the gaming device 100. Although illustrated as a single processing circuit, multiple special purpose and/or general purpose processors and/or processor cores may be provided in the gaming device 100. For example, the gaming device 100 may include one or more of a video processor, a signal processor, a sound processor and/or a communication controller that performs one or more control functions within the gaming device 100. The processing circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processing circuit 12. It will be appreciated that the components may be connected to the processing circuit 12 through a system bus 151, a communication bus and controller, such as a universal serial bus (USB) controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2D.

The memory device 14 may store program code and instructions, executable by the processing circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, Digital Video Disc ("DVD") or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or NFC that enable the gaming device 100 to communicate, for example, with a mobile communication device operated by a player. The communication adapter 26 may communicate with other devices using a wireless communication protocol that includes location and/or position data to the other devices.

The gaming device 100 may include one or more internal or external communication ports that enable the processing circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, Small Computer System Interface ("SCSI") ports, solenoids, speakers, thumb drives, ticket readers, touch screens, trackballs, touchpads, wheels, and wireless communication devices. In some embodiments, internal or external peripheral devices may communicate with the processing circuit through a USB hub (not shown) connected to the processing circuit 12.

In some embodiments, the gaming device 100 may include a sensor, such as a camera 127, in communication with the processing circuit 12 (and possibly controlled by the processing circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processing circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

In some embodiments, a gaming device 100 includes a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
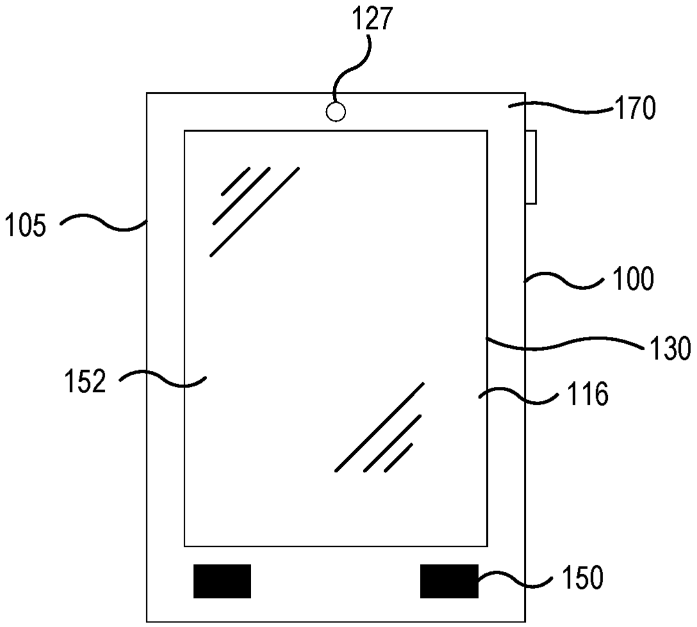
FIG. 2D is perspective view of a gaming device that can be configured according to some embodiments.

For example, referring to FIG. 2D, a gaming device 100 (which is a mobile gaming device 170 in this embodiment) may be implemented as a handheld device including a compact housing 105 on which is mounted a touchscreen display device 116 including a digitizer 152. One or more input devices 130 may be included for providing functionality of for embodiments described herein. A camera 127 may be provided in a front face of the housing 105. The housing 105 may include one or more speakers 150. In the gaming device 100, various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100 may omit certain features, such as a bill acceptor, a ticket generator, a coin acceptor or dispenser, a card reader, secondary displays, a bet display, a credit display, etc. Credits can be deposited in or transferred from the gaming device 100 electronically.

Figure 2E:
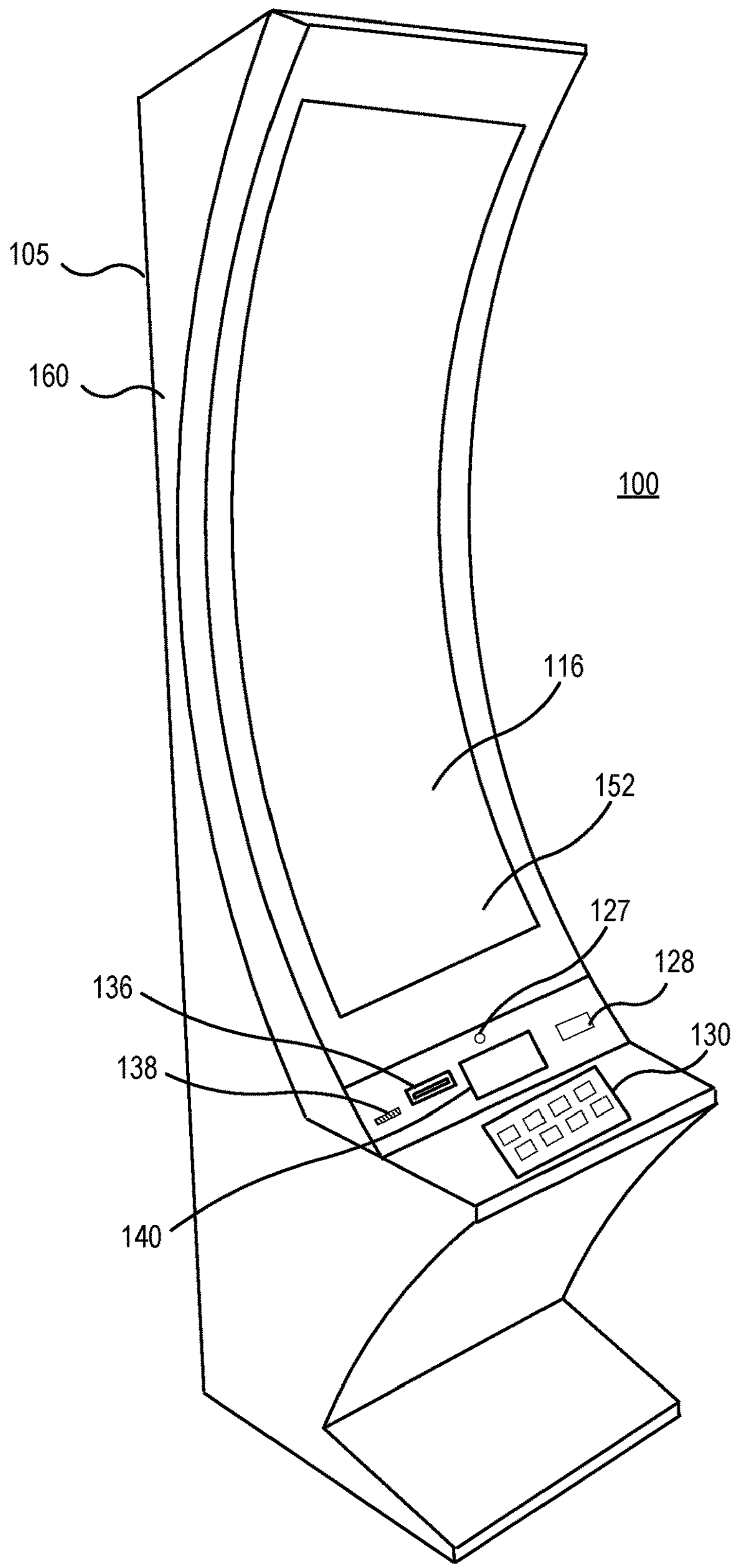
FIG. 2E is a perspective view of a gaming device according to further embodiments.

FIG. 2E illustrates a standalone gaming device 100 (which is an EGM 160 in this embodiment) having a different form factor from the EGM 160 illustrated in FIG. 2A. In particular, the gaming device 100 is characterized by having a large, high aspect ratio, curved primary display device 116 provided in the housing 105, with no secondary display device. The primary display device 116 may include a digitizer 152 to allow touchscreen interaction with the primary display device 116. The gaming device 100 may further include a player tracking display 142, an input device 130, a bill/ticket acceptor 128, a card reader 138, and a bill/ticket dispenser 136. The gaming device 100 may further include one or more cameras 127 to enable facial recognition and/or motion tracking.

Figure 2F:
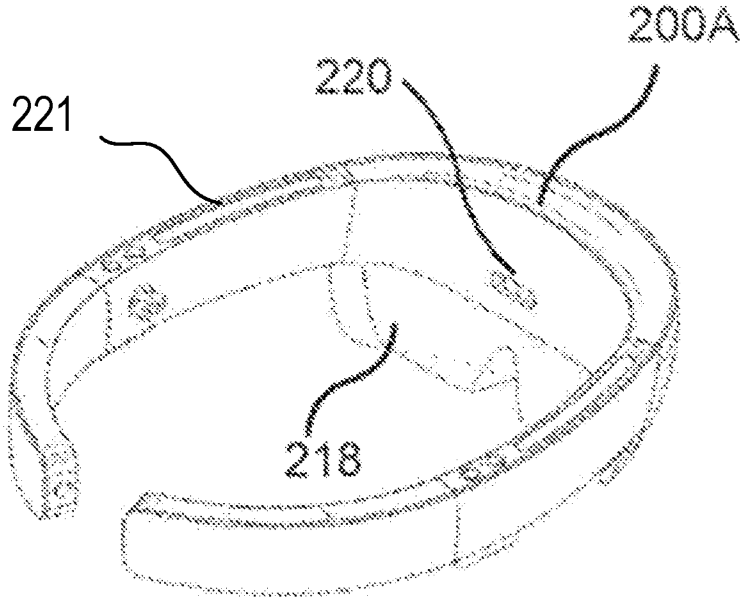
FIGS. 2F and 2G illustrate devices according to various embodiments.

FIG. 2F illustrates an augmented reality viewer 200A implemented as a 3D headset including a pair of displays 218 on which images of virtual objects may be displayed. The augmented reality viewer 200A includes a head-wearable frame 222, with the displays 218 coupled to the frame 221 to position the display device in a field of view of user wearing the augmented reality viewer 200A. Different stereoscopic images may be displayed on the displays 218 to create an appearance of depth. The augmented reality viewer 200A may include a plurality of sensors 220 that the device uses to determine a position, orientation, and/or movement of the augmented reality viewer 200A, which may be used to determine a position, orientation, and/or direction of movement within an SVE.

The augmented reality viewer 200A may further include other sensors, such as a gyroscopic sensor, a GPS sensor, one or more accelerometers, and/or other sensors that allow the augmented reality viewer 200A to determine its position and orientation in space. In some embodiments, the augmented reality viewer 200A may include one or more cameras that allow the viewer 200A to determine its position and/or orientation in space using visual simultaneous localization and mapping (VSLAM). The augmented reality viewer 200A may further include one or more microphones and/or speakers that allow the user to interact audially with the device.

In some embodiments, a viewer may also include semi-transparent lenses that allow the user to see both the real world as well as the 3D image rendered on the lenses, e.g., to provide an augmented reality (AR) experience. The viewer may also include additional cameras or other sensors to obtain a live video signal for building a 3D model of the space around the user. The viewer may also generate a 3D image of an object to display to the user that takes into account the real world objects around the user and allows the user to interact with the 3D object.

Figure 2G:
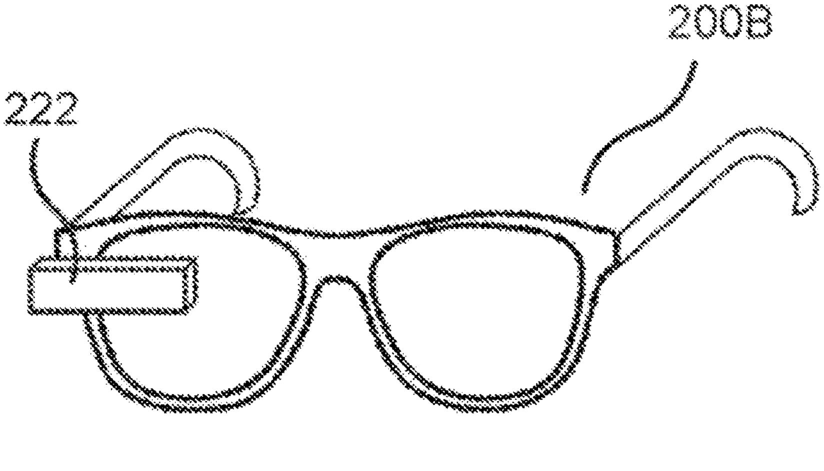

Referring to FIG. 2G, an augmented reality viewer 200B may be implemented as a pair of glasses including a transparent prismatic display 222 that displays an image to a single eye of the user. Such a device may be capable of displaying images to the user while allowing the user to see the world around the user, and as such can be used as an AR device.

In other embodiments, a VR and/or AR viewer may be implemented using a virtual retinal display device that raster scans an image directly onto the retina of the user. In still further embodiments, a VR and/or AR viewer may be implemented using a mobile wireless device, such as the mobile gaming device 170 of FIG. 2D above, a mobile telephone, a tablet computing device, and/or a personal digital assistant, etc.

Although illustrated as certain gaming devices, such as electronic gaming machines (EGMs), mobile gaming devices, VR/AR headsets, head worn audio devices, etc., functions and/or operations as described herein may also include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

Reference is now made to FIGS. 3A-3C, which are schematic block diagrams illustrating view of head worn audio devices 300 having front, top and side views according to some embodiments. Referring to FIGS. 3A-3C, left and right speakers 302 may be mechanically coupled to one another via a head-band 304. In some embodiments, the left and right speakers 302L, 302R may be communicatively coupled to one another. For example, the right and left speakers 302L, 302R may be wirelessly coupled with one another. In some embodiments, the left and right speakers 302L, 302R may be conductively coupled to one another via a wire and/or an electronic circuit.

One or each of the speakers 302 may include communication interfaces 306 that provide communication between the speakers 302 and/or external objects and/or systems.

Figure 4B:
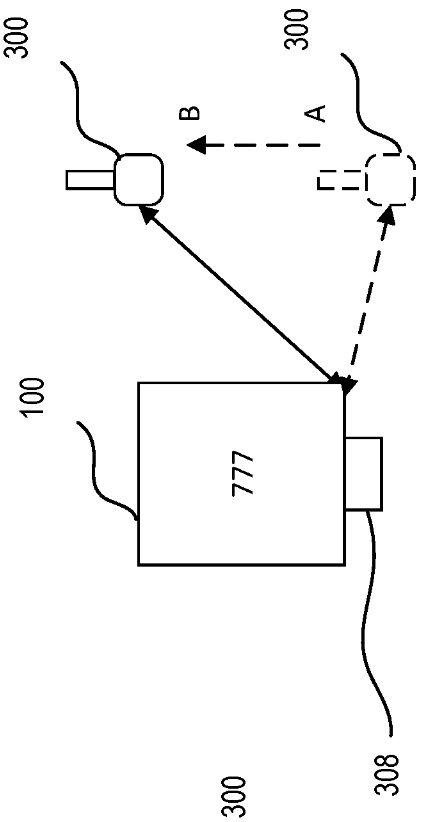
FIGS. 4A and 4B are schematic block diagrams illustrating determining location and/or movement data corresponding to a head worn audio device using a wireless communication protocol according to some embodiments herein.
Figure 4A:
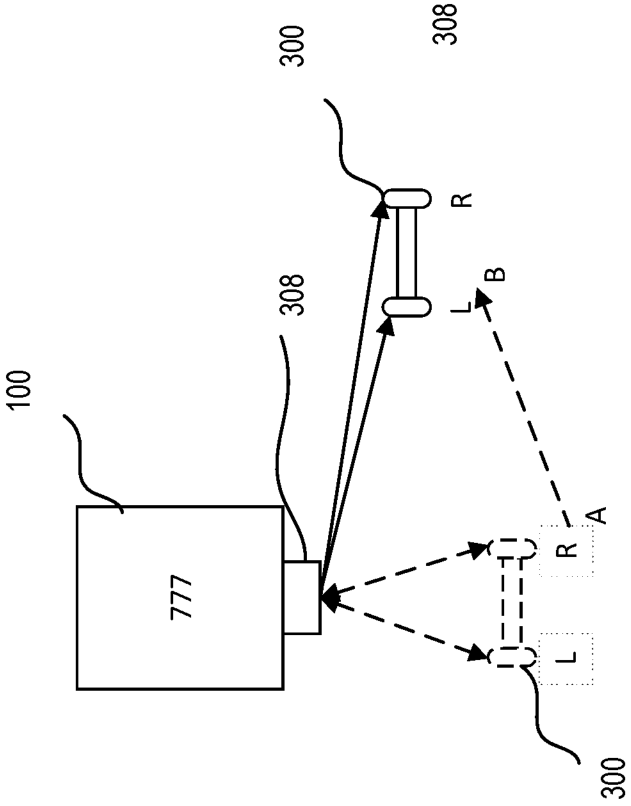

Brief reference is now made to FIGS. 4A and 4B, which are schematic block diagrams illustrating determining location and/or movement data corresponding to a head worn audio device 300 using a wireless communication protocol according to some embodiments herein. In some embodiments, the wireless communication protocol may include one or more different ones of the Bluetooth 5.1 standard or newer versions than Bluetooth 5.1. However, such embodiments are non-limiting as wireless communications other than Bluetooth that include location/position data are contemplated.

As illustrated, a player may move from a location A to a location B. A 3D location of both the left (L) speaker and the right (R) speaker provides that the three-dimensional (3D) location of both the left and right speakers of the head-worn audio device 200 changes from a first position A to a second position B. For example, FIG. 4A may illustrate a change in location relative to the EGM 100 in both distance and angle. Some embodiments provide that the EGM 100 is able to track the change of the head worn audio device 300 from location A to location B in real time and/or substantially real time. Based on the change in location, an audio experience provided by the head worn audio device 300 to the player may be based on the distance and/or angle to the EGM in real time. As illustrated in FIG. 4B, the side view of the head worn audio device 300 illustrates that the location change from A to B may also include vertical movement and/or height.

Figure 5A:
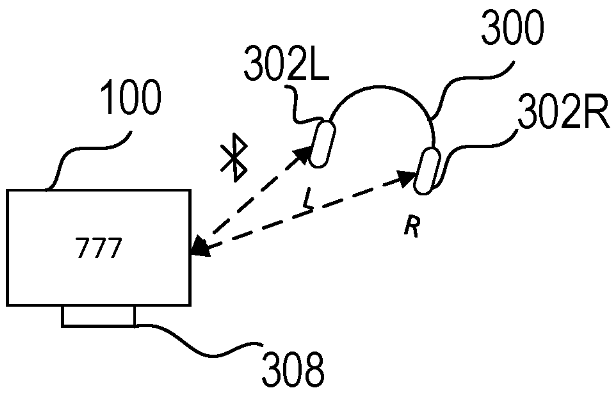
FIGS. 5A-C are schematic block diagrams illustrating using location and/or movement data corresponding to a head worn audio device according to some embodiments herein.
Figure 5B:
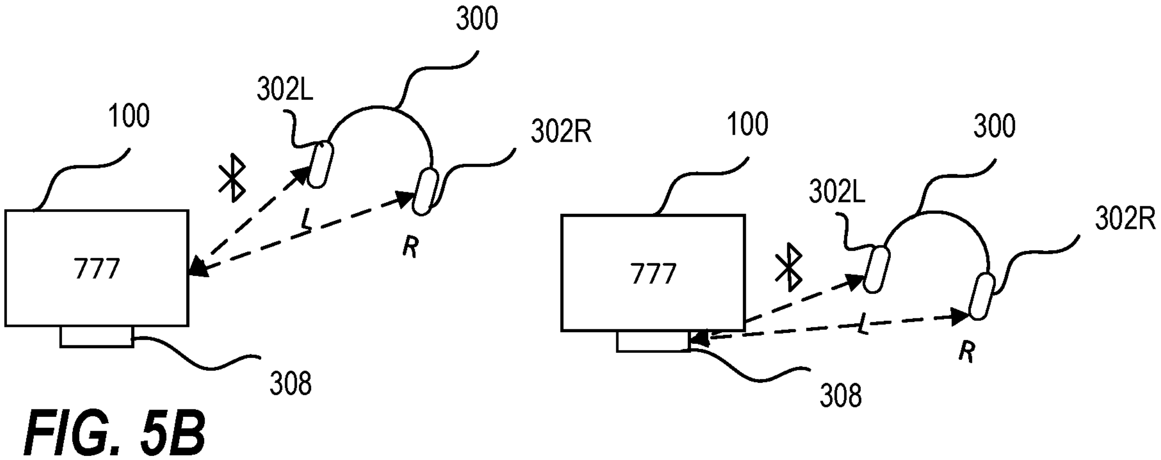
Figure 5C:
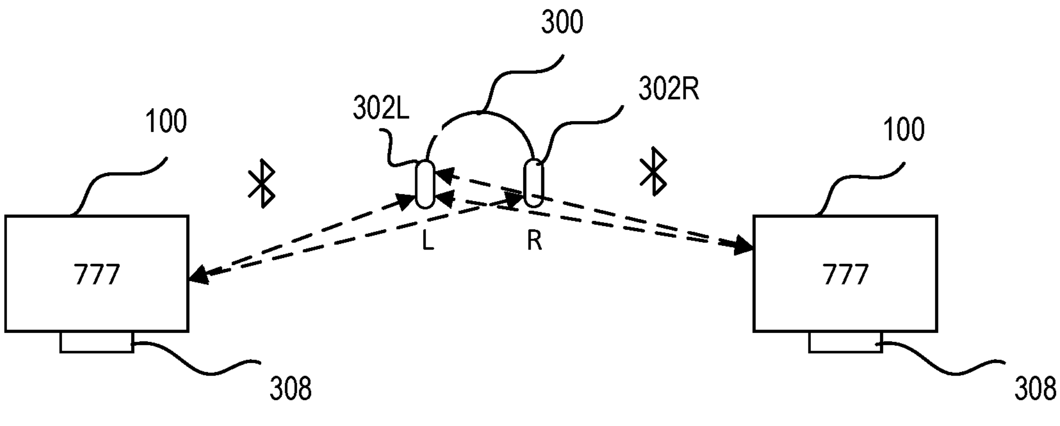

Brief reference is made to FIGS. 5A-C, which are schematic block diagrams illustrating using location and/or movement data corresponding to a head worn audio device 300 according to some embodiments herein. Referencing FIG. 5A, a head worn audio device 300 that may be a pair of wireless communication connected headphones may be directly connected to an EGM 100 via Bluetooth 3D tracking. Some embodiments provide that the EGM 100 may be aware of the location of the right speaker 302R (distance, height, rotation) relative to the EGM 100 and/or the left speaker 302L. Similarly, the left speaker 302L may be aware of the location of right speaker 302R (distance, height, rotation). Based on the relative positions of the EGM 100. Some embodiments provide that the EGM 100 may generated 3D audio experiences and sending signals corresponding to such audio experiences directly to the head worn audio device 300 including Bluetooth connected head phones.

Briefly referring to FIG. 5B, the two pairs of head worn audio devices 300 may each be directly connected to a different EGM 100. Referring to FIG. 5C, a single head worn audio device 300 may directly couple with two EGMs 100 via Bluetooth 3D tracking. Some embodiments provide that each EGM 100 may know the 3D location of the head worn audio device 300 relative to the corresponding EGM 100.

Referring to FIG. 5C, one head worn audio device 300 may be directly connected to two EGMs 100. In some embodiments, each EGM 100 may know the location of the head word audio device 300, relative to the EGM 100.

Figure 6A:
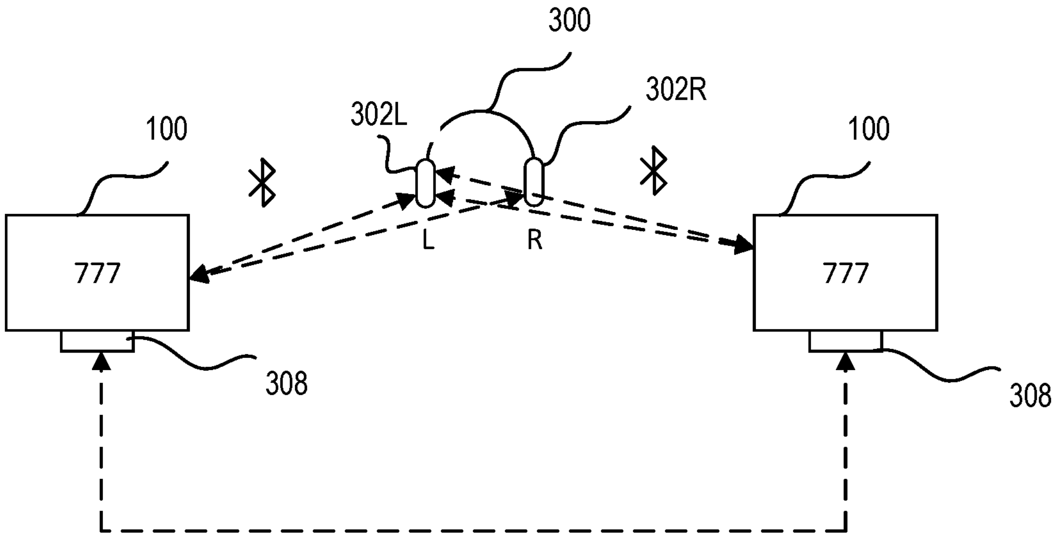
FIGS. 6A and 6B are schematic block diagrams illustrating using location and/or movement data corresponding to a head worn audio device according to some embodiments herein.
Figure 6B:
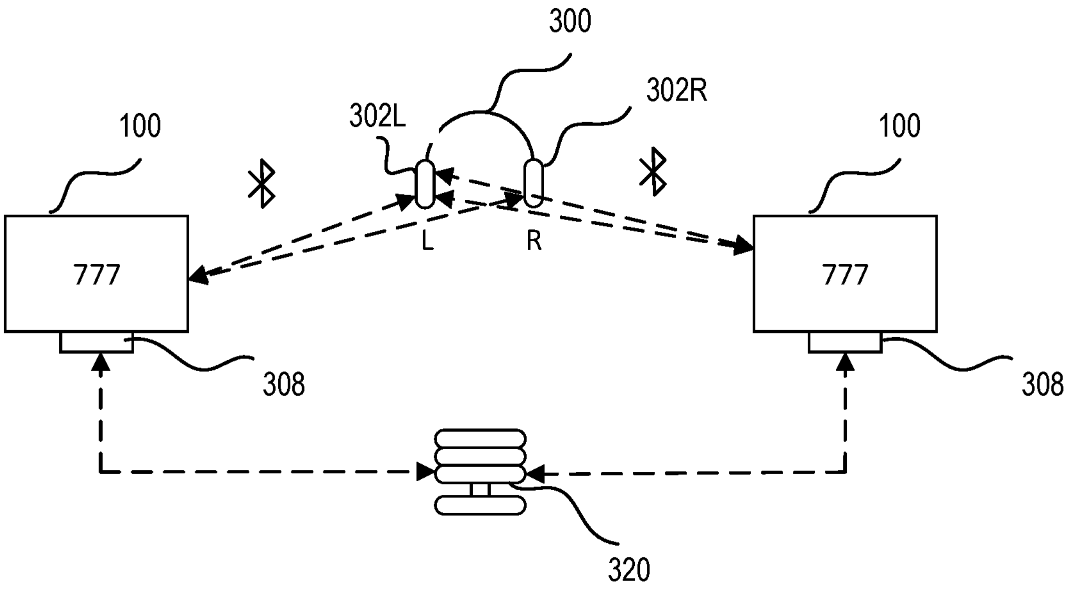

Reference is now made to FIGS. 6A and 6B, which are schematic block diagrams illustrating using location and/or movement data corresponding to a head worn audio device 300 according to some embodiments herein. Referring to FIG. 6A, one head worn audio device 300 may be directly connected to 2 EGMs 100 through Bluetooth 3D tracking. In some embodiments, each EGM 100 may know the 3D location of the head worn audio device relative to the specific EGM 100. In some embodiments, the EGMs 100 are able to directly communicate with other EGMs 100 via a wireless, wired and/or Bluetooth communication protocol. In such embodiments, the EGMs 100 may share information with one another that is relevant to enhanced audio corresponding to the player's 3D audio experience.

Referring to FIG. 6B, instead of a direct connection therebetween, the EGMs 100 may communicate with one another through a casino system 320. Some embodiments provide that the casino system 320 may also provide that information with a casino operator. For example, some embodiments provide that the EGMs 100 use bidirectional communication with respect to the casino system 320.

Figure 7A:
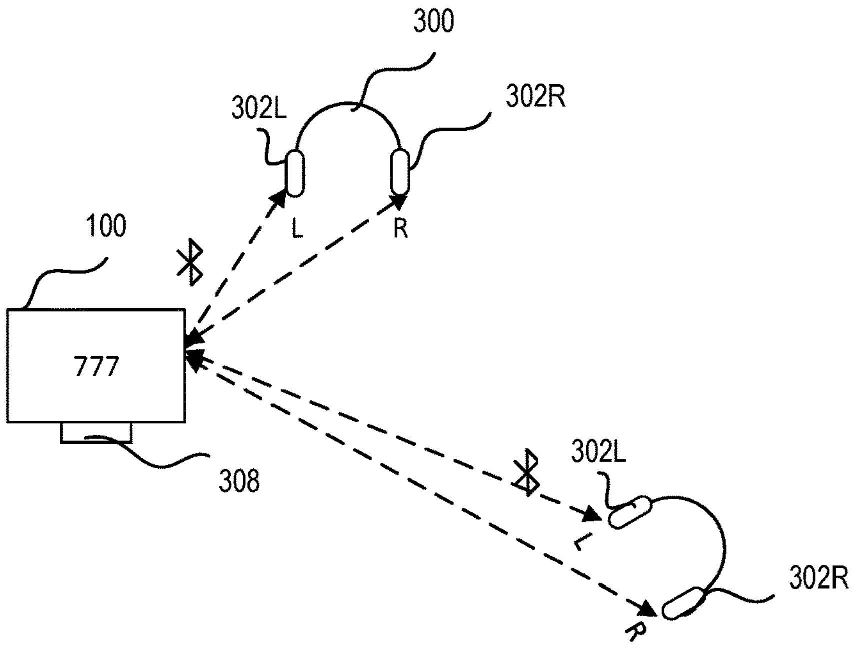
FIGS. 7A and 7B are schematic block diagrams illustrating using location and/or movement data corresponding to a head worn audio device according to some embodiments herein.
Figure 7B:
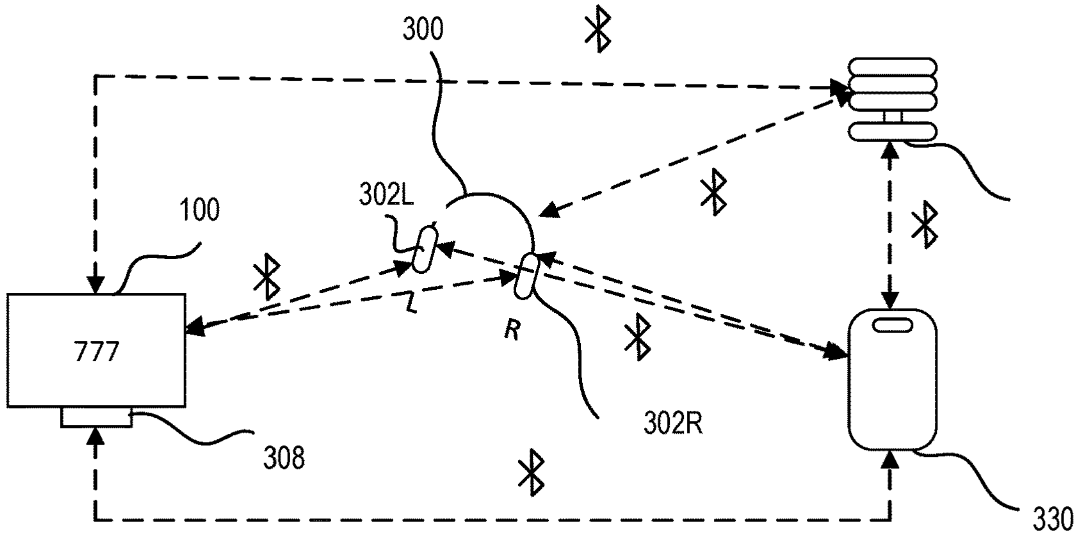

Reference is now made to FIGS. 7A and 7B, which are schematic block diagrams illustrating using location and/or movement data corresponding to a head worn audio device 300 according to some embodiments herein. Referring to FIG. 7A, two head worn audio devices 300 may be directly connected to a single shared EGM 100. In some embodiments, the EGM 100 may be aware of the location of each head worn audio device 300 and may produce a unique 3D audio experience for each player based on the 3D location of each of the head word audio devices 300. Referring to FIG. 7B, a plurality of different options for bidirectional communication may be based on the 3D locations of the head worn audio devices 300.

Referring to FIG. 7B, examples of communication configurations and paths include an EGM 300 directly connected to a head worn audio device with 3D tracking. In some embodiments a mobile device 330 acting as "man in the middle" device may enable additional data sharing with an EGM 100 and/or a casino system 320.

Embodiments may include a mobile device 330 connected to an EGM 100 that may use WiFi and/or Bluetooth, among others, to enable additional data exchange. Such data exchange may be in addition to the 3D tracking and may be with the EGM 100. Such information may include personal information, account information, and/or personal settings applied, among others.

Some embodiments provide that a mobile device 330 connected to casino system may enable additional data exchange. Such data exchange may be in addition to the 3D tracking and may be with a casino system 320. Such information may include personal information, account information, and/or personal settings applied, among others.

In some embodiments, a casino system 330 connected to a head worn audio device 300 may provide 3D tracking relative to a casino system 330.

In some embodiments, a casino system 330 may be connected to an EGM 100 (wired, WiFi, BT) to enable additional data exchange based on information gathered from the 3D connected head worn audio device.

Figure 8:
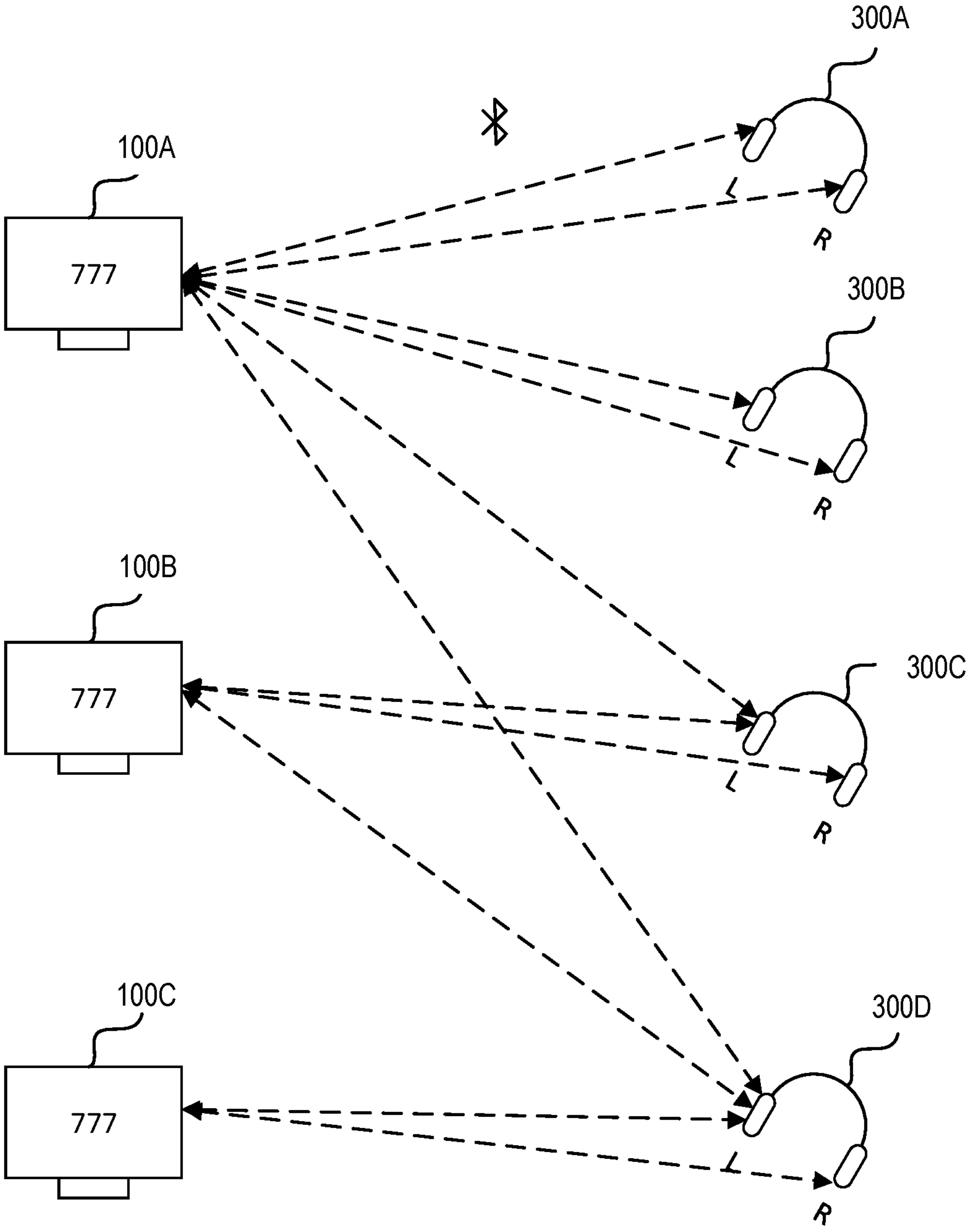
FIG. 8 is a schematic block diagram illustrating using location and/or movement data corresponding to a head worn audio device according to some embodiments herein.

Reference is now made to FIG. 8, which is a schematic block diagram illustrating using location and/or movement data corresponding to a head worn audio device 300 according to some embodiments herein. Some embodiments provide that a plurality of EGMs 100A-100C may be operable to be connected to head worn audio devices 300A-300D. For example, a two player game may provide that two connected head worn audio devices 300A, 300B are connected to the same EGM 100A. Each of the head worn audio devices 300A, 300B may be 3D connected and may receive their unique 3D audio experience.

Additionally, head worn audio devices 300C and 300D may be connected to EGM 100A on an informational basis such as informing the player of head worn audio devices 300C, 300D when EGM 100C is free again and/or responsive to certain relevant game events happen, such as a posting of high score or the like. Some embodiments provide that this connection may not need highly accurate 3D tracking and may be less in-game-related while still keeping the player up to date.

In some embodiments, EGM 100B may be connected with head worn audio devices 300C and 300D. In such embodiments, head worn audio device 300C may be 3D tracked as an active player of EGM 100B. Head worn audio device 300D may be connected on a "FYI basis" only.

EGM 100C may be connected with head worn audio device 300D only as an active player. Head worn audio device 300C may be connected with EGMs 100A, 100B. Some embodiments provide that a connection between head worn audio device 100C and EGM 100B may be based on 3D tracking corresponding to EGM 100B. In some embodiments, head worn audio device 300C may be connected to EGM 100A while playing at EGM 100B.

Head worn audio device 300D may be connected to EGMs 100A, 100B and 100D to provide an FYI-connection only, but to both at the same time, while playing at EGM 100C. Additionally, EGM 100C may provide an active player based on the head worn audio device 300D. Head worn audio device 300D may be connected to EGM 100C to provide active 3D tracking of EGM 300C.

Figure 9:
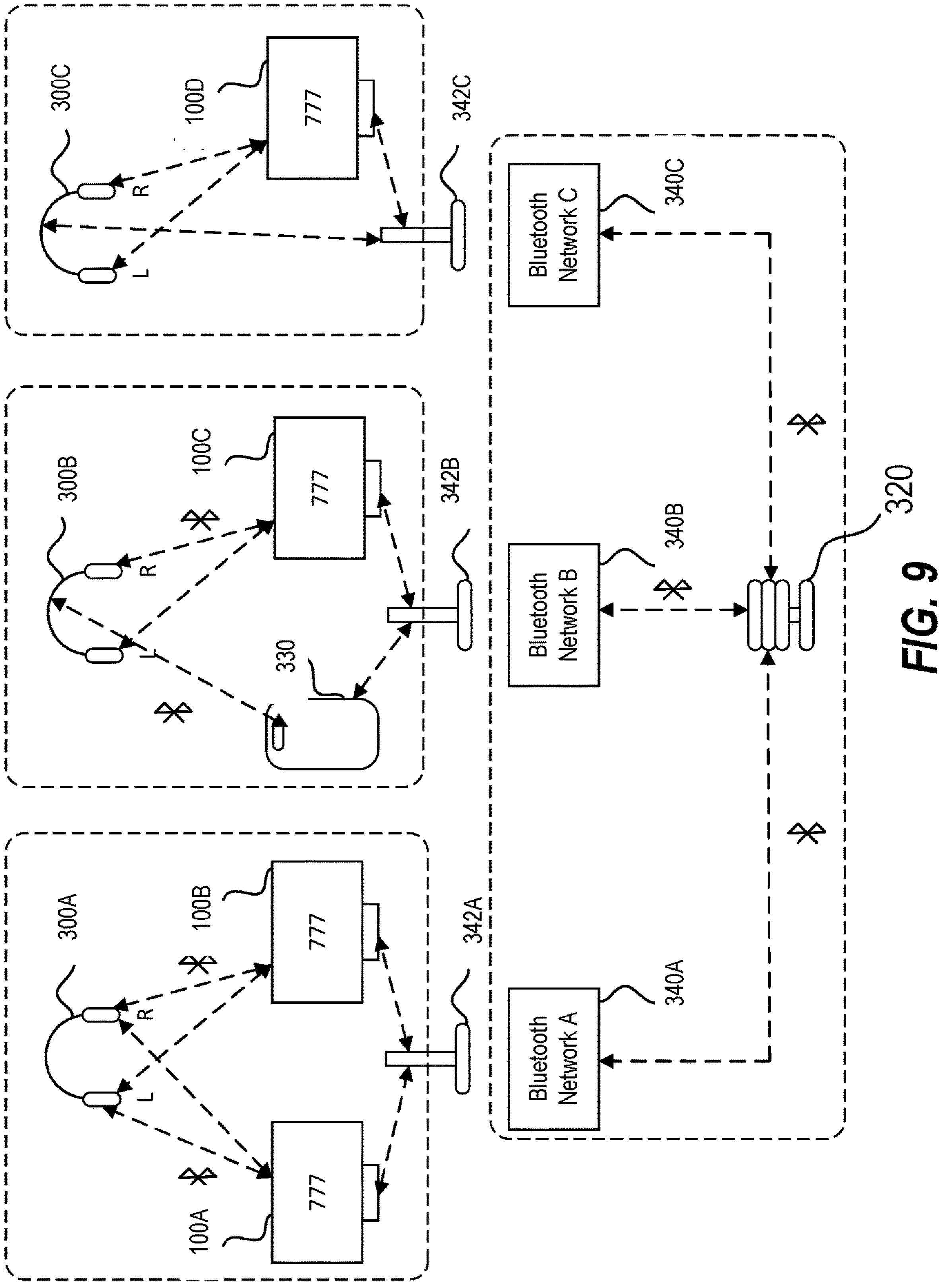
FIG. 9 is a schematic block diagram illustrating networks using location and/or movement data corresponding to a head worn audio device according to some embodiments herein.

Reference is now made to FIG. 9, which is a schematic block diagram illustrating networks using location and/or movement data corresponding to a head worn audio device 300 according to some embodiments herein. Some embodiments provide that multiple Bluetooth networks 340A-340C may support Bluetooth and/or other wireless and/or wired communications. As illustrated, each of the three Bluetooth networks 340A-340C may provide a certain range based on a routing device 342A-342C location and/or device types. In some embodiments, the Bluetooth networks 340A-340C may be optionally connected to a casino system 320. For example, the central casino system 320 may be connected to each of the Bluetooth networks 340A-340C and may be able to share communication across each. In some embodiments, known devices may be allowed to auto-connect in another network.

Each of the Bluetooth networks 340 may include different configurations therein that may include a network access point 342A-342C. For example, Bluetooth network 340A may include a head worn audio device 300A that may be connected to two EGMs 100A, 100B. In such embodiments, both EGMs 100A, 100B may share data with a network access point 342A. Bluetooth network 340B may provide that a head worn audio device 300B is connected to a single EGM 100C and a mobile device 330 may be used to share a network access point 340B. Additionally, Bluetooth network 340C may provide that a head worn audio device is connected to an EGM 100C and the access point 342C to share data directly with the network access point.

Figure 10:
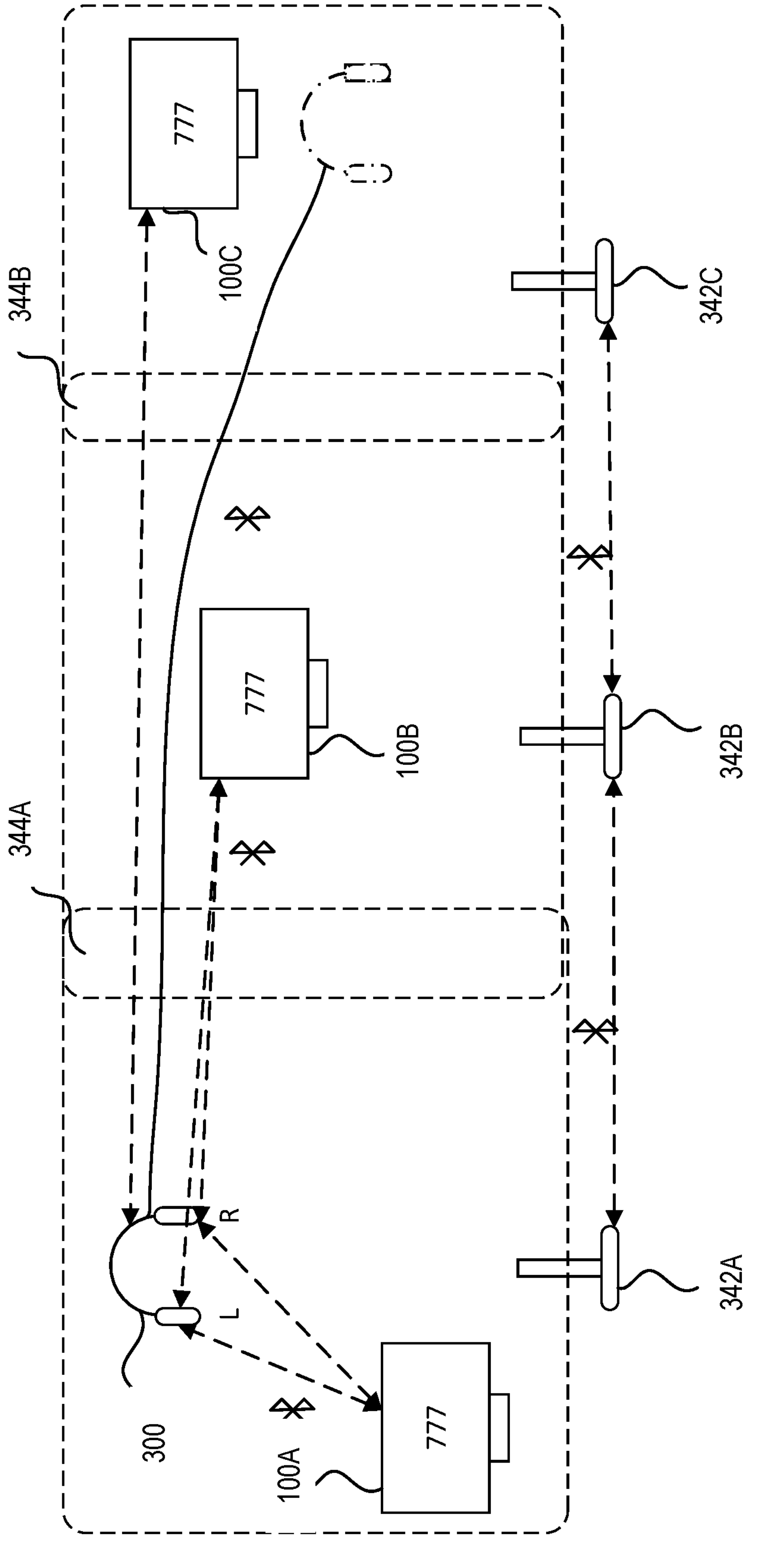
FIG. 10 is a schematic block diagram illustrating networks using location and/or movement data corresponding to a head worn audio device according to some embodiments herein.

Reference is now made to FIG. 10, which is a schematic block diagram illustrating networks using location and/or movement data corresponding to a head worn audio device 300 according to some embodiments herein. As illustrated, multiple networks may support Bluetooth and/or other wireless and/or wired networks. Different networks may be configured to provide overlapping ranges 344A, 344B. In this manner, tethering and/or movement across the networks without losing a connection nor requiring additional set-ups may be provided. In some embodiments, networks may be provided using mesh network configurations.

As illustrated, a head worn audio device 300 may be 3D Bluetooth connected to an EGM 100A in network 342A. Simultaneously, the head worn audio device 300 may be 3D Bluetooth connected to a second EGM 100B in network 342B. Further, the head worn audio device 300 may be connected to another EGM 100C in network 342C in a low priority mode that is used only when data capability is unavailable via other networks. In such embodiments, the player may move from network 342A to network 342B and then to network 342C without losing connections to any of the connected EGMs 100.

Figure 11:
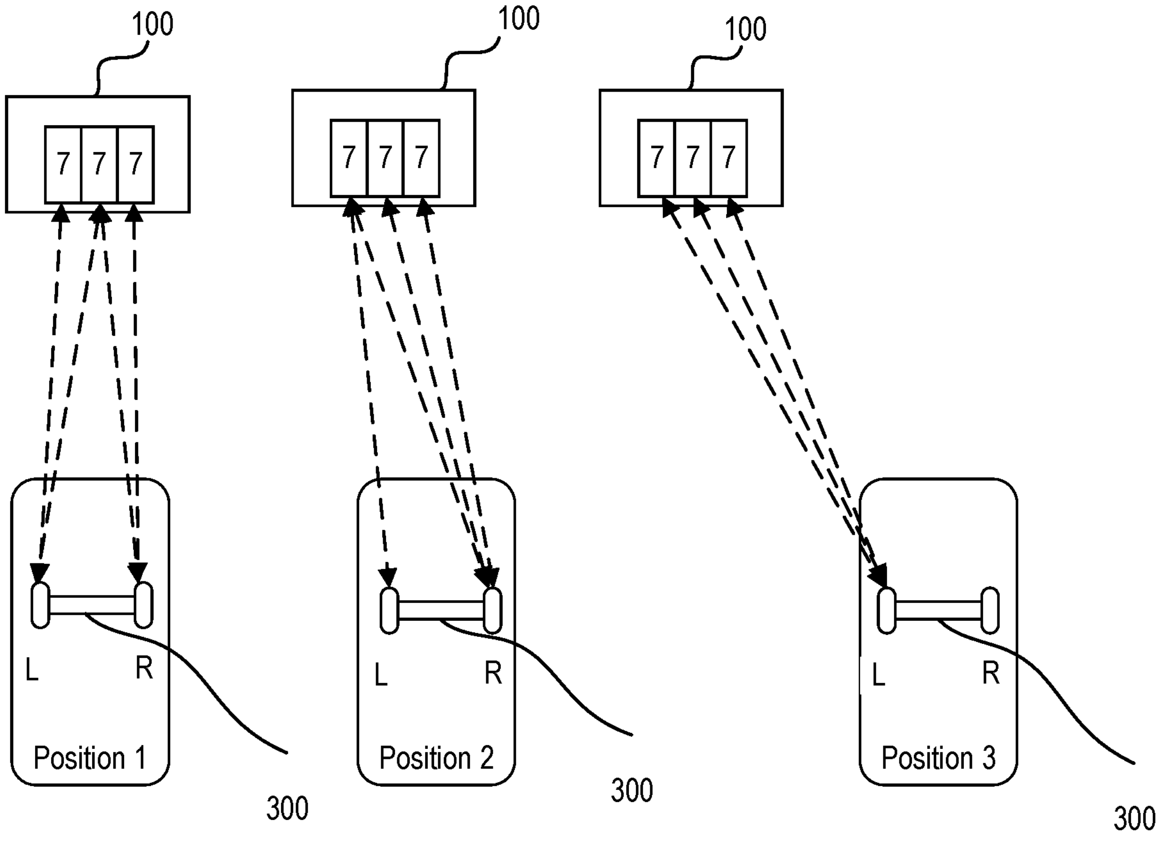
FIG. 11 is a schematic block diagram illustrating networks using location and/or movement data corresponding to a head worn audio device according to some embodiments herein.

Reference is now made to FIG. 11, which is a schematic block diagram illustrating networks using location and/or movement data corresponding to a head worn audio device 300 according to some embodiments herein.

In some embodiments, 3D audio features may be provided in slot game play. For example, 3D audio features may be heard depending on a player's position. For example, in an arrangement of multiple head worn audio devices 300 having audio content corresponding to multiple EGMs 100, the audio content may vary based on position. For example, a head worn audio device 100 at position 1 may hear the left reel at the left speaker. Similarly, the middle reel may be equally heard by the left and right speakers and the right reel may be heard by the right speaker.

The head worn audio device 300 at position 2, which includes a position that is slightly offset relative to the EGM 100, may hear the left reel and right reel equally by each of the left and right speakers. Similarly, the middle reel may be heard by the right speaker and the right reel is heard by the right speaker.

The head worn audio device 300 at position 3, which includes a position that is significantly offset relative to the EGM 100, may hear the left, center and right reels equally by the left speaker.

In some embodiments, instead of completely splitting to L/R speakers, the volume may also increment dynamically. For example, in position 3, the volume could also be played: Left (90% L, 10% R), Middle (80% L, 20% R); Right (70% L, 30% R). Similar approach may be provided to apply to any effects happening on one of the reels (or across multiple of the reels).

According to the present disclosure, some embodiments herein provide functionality of 3D location tracking and enhanced audio content. In some embodiments, audio volume may depend on distance relative to a machine. For example, an audio increase may occur when a player proceeds towards an EGM and/or another head worn audio device and may decrease when moving away from the connected machine. In some embodiment, the audio volume may be dynamically increased or decreased every time the connected device moves a given distance relative to the head worn audio device. In some embodiments, the dynamic increase/decrease provides a specific increase or decrease of the volume per unit distance that the head worn audio device move to/from the connected device.

In some embodiments, the audio volume may depend on a distance relative to a virtual object. For example, a virtual object may be shown in a virtual 3D scenery. The audio volume may be relative to the object moving away from the player in the virtual scenery. Some embodiments provide that the player's physical movement relative to the object increases/decreases volume. For example, if at the same time the object moves farther into the 3D scenery and the player moves farther away from EGM, the volume may be decreased twice as fast.

In some embodiments, a 3D audio experience may be based on a player's rotation angle towards the machine, which may be determined based on the distance measurements of the left and right ears. For example, if player turns to their right to position the right ear to be farther away from machine, then they may hear game sound more on the left ear. If a player turns 180° degrees away from machine, then they may hear the game sound as if coming from behind them.

Some embodiments provide that the 3D audio experience may be based on player's height. For example, instead of just tracking horizontal distance relative to the location of a head worn audio device, the head worn audio device may track the vertical distance and/or height relative to the connected machine. Thus, a smaller (shorter) player may hear the 3D game audio more above their head if their head is at a relatively low height relative to the game screen. In contrast, a taller player may hear the 3D game audio more below their head. In some embodiments, this may be tracked in real time. Thus, moving a player's chair up/down may create the same effect. In the case of a virtually moving object, such as one provided on a huge upright screen, the same effect may be created. As such, if the virtual object is moving to the very upper part of the upright screen the game audio may be heard as coming from below the player.

Some embodiments provide that the 3D audio experience may be based on the screen being used. For example, in the case of having multiple different screens, such as a digital button panel vs. main screen vs. upper screen vs. topper screen, the vertical 3D audio may be generated depending on which screen the audio is coming from. In some embodiments, the relative position from the headphone's location to the certain screen's position may determine the location of the audio.

In some embodiments, simultaneous sounds from multiple screens may create multiple 3D audio experiences at the same time. For example, a top screen may transmit 3D audio towards the player's ears from above and relative to the distance from the top screen to the player's ears, and at the same time 3D audio from the digital button panel from below relative to the distance from the digital button panel to the player's cars.

In some embodiments, a 3D audio experience may be based on the screen location of a mechanically moving EGM screen. In such cases, the same 3D vertical sound effect may be created. Once the screen is mechanically moving up/down, the player's car distance relative to the mechanically moving screen content may be tracked.

Some embodiments may identify a player's direction of sight depending on orientation & distance of left speaker vs. right speaker, relative to the connected machine. For example, creation of 3D audio experiences may be based on direction of sight, in real-time. Some embodiments provide hearing the physical in-game location where sound is coming from and adjusting according to player's head movement, in real-time.

In some embodiments, a 3D audio experience may be based on the screen location of a mechanically moving EGM screen. In such cases, the same 3D vertical sound effect may be created. Once the screen is mechanically moving up/down, the player's car distance relative to the mechanically moving screen content may be tracked.

Some embodiments may identify a player's direction of sight depending on orientation & distance of left speaker vs. right speaker, relative to the connected machine. For example, creation of 3D audio experiences may be based on direction of sight, in real-time. Some embodiments provide hearing the physical in-game location where sound is coming from and adjusting according to player's head movement, in real-time.

Some embodiments provide enabling/disabling audio sources just by direction of sight. For example, looking to one side may disable one speaker to hear the surrounding better audio more clearly. When playing on multiple machines, a player may look at one of the machines to hear and the other sound may be disabled. In some embodiments, when playing 3 EGMs at a time, a player may look towards the EGM that they want to hear with 100 percent volume and hear the others at some lower volume, such as, for example, 20 percent of the full volume.

Some embodiments provide that a player may look at other EGMs at any time to select this EGM to hear with 100 percent volume. Some embodiments may include a dynamic volume increase/decrease depending on direction of sight. For example, an increased/decreased volume of EGM may be determined by an angle at which the player is looking towards the EGM. Some embodiments provide that in a bonus skill game, a player may win more when moving their head in a specific pattern guided by sounds. Some embodiments provide a pick feature in which a player is instructed to turn away from the machine. The player may then be asked to hear the mystery sound and to know which pick will have positive results.

In some embodiments, audio features may be used with and/or in combination with active noise canceling control, which may be implemented based on ambient sound and/or head position. For example, when looking towards the casino floor, active noise cancellation may be automatically deactivated. For example, a player may want to hear what is going on the floor. Similarly, when looking towards the EGM, active noise cancellation may be automatically activated in case the player wants to focus on the game. In some embodiments, a player may hear things that happen off-screen when leaning left or right. In some embodiments, hearing things that happen off-screen may help for selections.

In some embodiments, multiple EGM 3D tracking may depend on a relative position to each EGM. For example, if played on two EGMs simultaneously, depending on the position and/or direction of looking, each EGM sound may be played more left/right, depending on the position relative to each EGM.

Some embodiments provide that multiple EGM 3D tracking, may depend on in-game events happening on each EGM. For example, a currently "hotter" machine's sound may be played louder than a less hot machine. Similarly, a machine that may be close to a big win, such as a jackpot, may have a louder volume than other machines that appear to be farther from a big win.

Some embodiments may track a multiple player tracking 3D location at the same time and play 3D audio depending on each location, in real-time. In some embodiments, all of the above-mentioned features and/or examples, may provide a unique, parallel 3D audio experience for each player.

In some embodiments, 3D audio based on tracking may also include providing 3D audio based on different types of gaming machines. Some embodiments provide that 3D audio may be simultaneously tracked and determined for EGMS's and for electronic table games (ETG's). For example, a player may be simultaneously audio connected with both an EGS and an ETG and respective locational 3D audio may be received from both the EGN and the ETG depending on distance, rotation, and/or location, among others.

In some embodiments, 3D audio features may be provided in slot game play. For example, 3D audio features may be heard depending on a player's position.

When connected to the casino Bluetooth mesh system a gaming machine may whisper to a player to play with it, as sort of an additional attract mode feature. Some embodiments provide that, depending on the orientation of the head, the sound may be played on the correct speaker for the player to locate the machine more easily.

Figure 12:
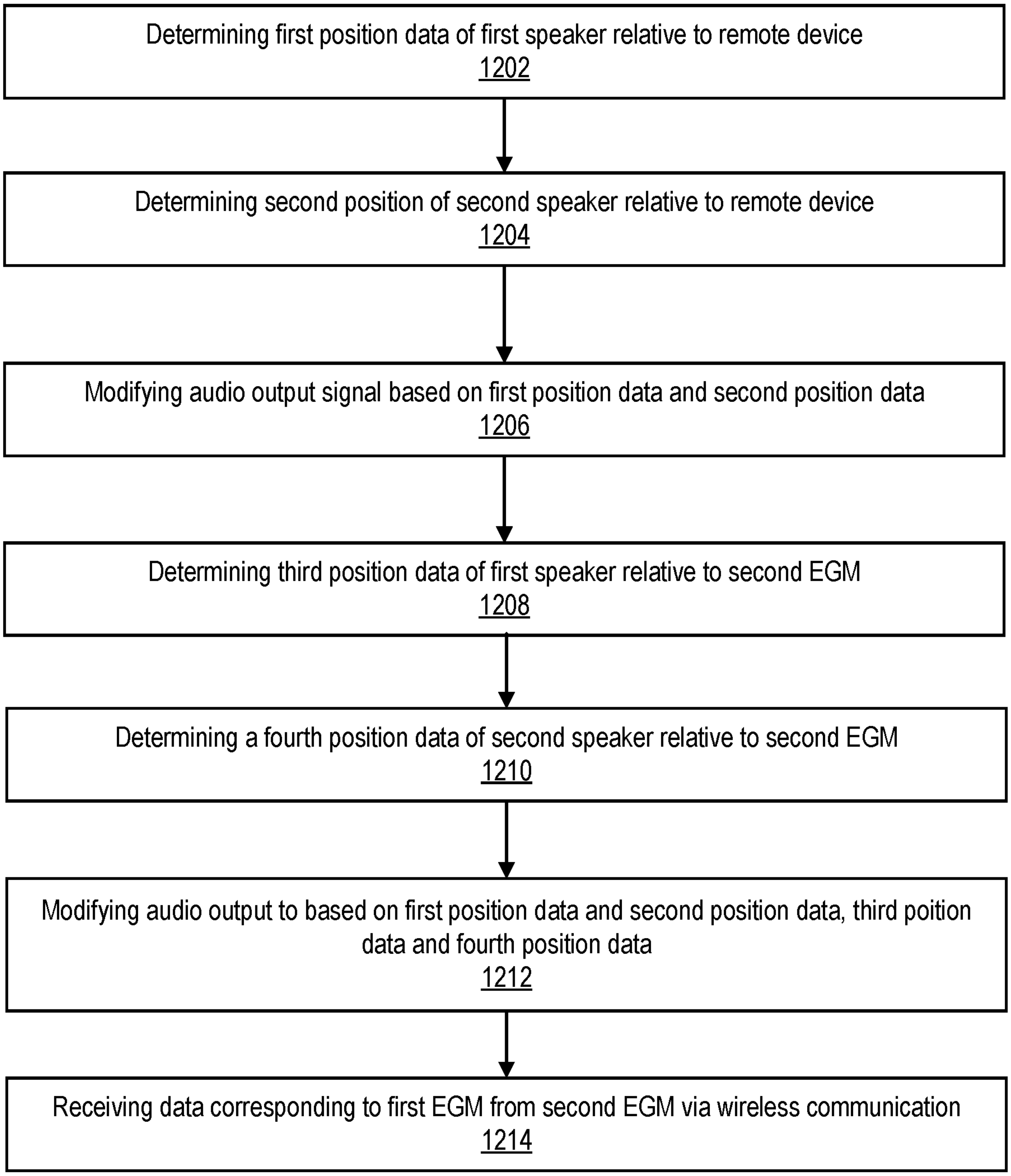
FIGS. 12-14 are flowcharts illustrating operations of systems/methods of facilitating three-dimensional position tracking to provide audio, according to some embodiments.

Reference is now made to FIG. 12, is a schematic block diagram illustrating systems, devices, and methods for facilitating embodiments described herein. A system herein includes a wearable wireless audio device that provides an audio output signal and that includes a first speaker corresponding to a first antenna and a second speaker that is spaced apart from the first speaker and that corresponds to a second antenna. The system further includes a wireless communication interface that is wirelessly coupled to a remote device antenna of a remote device and to the first antenna and the second antenna. The system includes a processor circuit and a memory including machine-readable instructions that, when executed by the processor circuit, cause the processor circuit to perform certain operations. Operations include determining (block 1202), based on communications between the first antenna and the remote device antenna, first position data of the first speaker relative to the remote device. Operations may include determining (bock 1204), based on communications between the second antenna and the remote device antenna, second position data of the second speaker relative to the remote device. Operations may include modifying (block 1206) the audio output signal of the wearable wireless audio device based on the first position data and the second position data.

In some embodiments, the first position data corresponds to a first distance from the first speaker to the remote device and the second position data corresponds to a second distance from the second speaker to the remote device. In response to the first distance being greater than the second distance, a first speaker audio volume is greater than a second speaker audio volume.

In some embodiments, the first position data corresponds to a first distance from the first speaker to a virtual event occurring in the remote device and the second position data corresponds to a second distance from the second speaker to the virtual event occurring in the remote device. In response to the first distance being greater than the second distance, a first speaker audio volume may be greater than a second speaker audio volume.

In some embodiments, wherein the first position data corresponds to a first distance from the first speaker to a virtual event occurring in the remote device and the second position data corresponds to a second distance from the second speaker to the virtual event occurring in the remote device. In response to the first distance being greater than the second distance, a first speaker audio volume may be less than a second speaker audio volume.

In some embodiments, the first position data and the second position data correspond to a rotary angle of the wearable wireless audio device towards the remote device that is determined based on a difference between the first position data and the second position data. In response to an increase in the rotary angle, a difference between a first speaker volume of the first speaker and a second speaker volume of the second speaker may be caused to increase.

In some embodiments, the first position data and the second position data each correspond to a height of the wearable wireless audio device relative to a height of the remote device. In response to the height of the wearable wireless audio device being lower than the height of the remote device, the audio output signal of the first and second speakers may be modified to cause the audio output signal to originate from a greater height than the height of the wearable wireless audio device. In response to the height of the wearable wireless audio device being greater than the height of the remote device, the audio output signal of the first and second speakers may be modified to cause the audio output signal to originate from a lower height than the height of the wearable wireless audio device.

In some embodiments, the remote device antenna includes an electronic gaming machine (EGM) antenna that is wirelessly coupled to the wearable wireless audio device and that provides first audio data that determines an output of the first speaker and second audio data that determines an output of the second speaker. Some embodiments provide that the EGM includes a first EGM including a first EGM antenna and a second EGM including a second EGM antenna. In some embodiments, the processor circuit is further caused to determine (block 1208), based on communications between the first antenna and the second EGM antenna, third position data of the first speaker relative to the second EGM. Operations may include determining (block 1210), based on communications between the second antenna and the second EGM antenna, fourth position data of the second speaker relative to the second EGM. Operations include modifying (block 1212) the audio output signal of the wearable wireless audio device based on the first position data, the second position data, the third position data and the fourth position data.

In some embodiments, the wearable wireless audio device is further caused to receive (block 1214) data corresponding to the first EGM from the second EGM via wireless communication between the first EGM and the second EGM.

Some embodiments provide that the wearable wireless audio device includes a first wearable wireless audio device that wirelessly communicates with the EGM and a second wearable wireless audio device that communicates with the EGM. In some embodiments, the processor circuit to modify the audio output signal is caused to modify the audio output signal of the first wearable wireless audio device based on first position data and to modify the second wearable wireless audio device based on second position data that is different from the first position data.

In some embodiments, the wearable wireless audio device includes multiple wearable wireless audio devices that each include the first antenna, the first speaker, the second antenna and the second speaker. In some embodiments, the remote device antenna includes multiple remote antenna devices. Some embodiments provide that each of the wearable wireless audio devices provides location data to each of the remote device antennas. In some embodiments, each of the wearable wireless audio devices receives audio output signal data from each of the remote device antennas.

In some embodiments, the first position data and the second position data indicate a user's direction of sight. Some embodiments provide that, responsive to the user's direction of sight being directed at the remote device that comprises a display, the audio output signal is modified based on a visual content being displayed on the display. In response to the user's direction of sight being directed towards different ones of a plurality of visible zones, the processor circuit is further caused to modify the audio output signal to correspond with content in each of the visible zones. Some embodiments provide that a bonus skill game include providing the audio output signal that includes a changing direction of sight and receiving a changed position of the wearable wireless audio device to be proximate the audio output signal. In responsive to the audio output signal corresponding to the changed position of the wearable wireless audio device, a bonus prize was awarded.

In some embodiments, the remote device antenna includes an EGM antenna that is wirelessly coupled to the wearable wireless audio device. Some embodiments provide that the remote device antenna further includes an electronic table game (ETG) antenna that is wirelessly coupled to the wearable wireless audio device and the wearable wireless audio device is further caused to receive data corresponding to the ETG.

In some embodiments, the remote device includes multiple EGMs that include a mesh network of EGMs. In some embodiments, based on the first position data and the second position data corresponding to the wearable wireless audio device, the audio output signal is modified to include an invitation to play one of the plurality of EGMs.

In some embodiments, the processor circuit that modifies the audio output is further caused to selectively provide active noise cancellation to one of the first speaker or the second speaker based on the first position data and the second position data.

Figure 13:
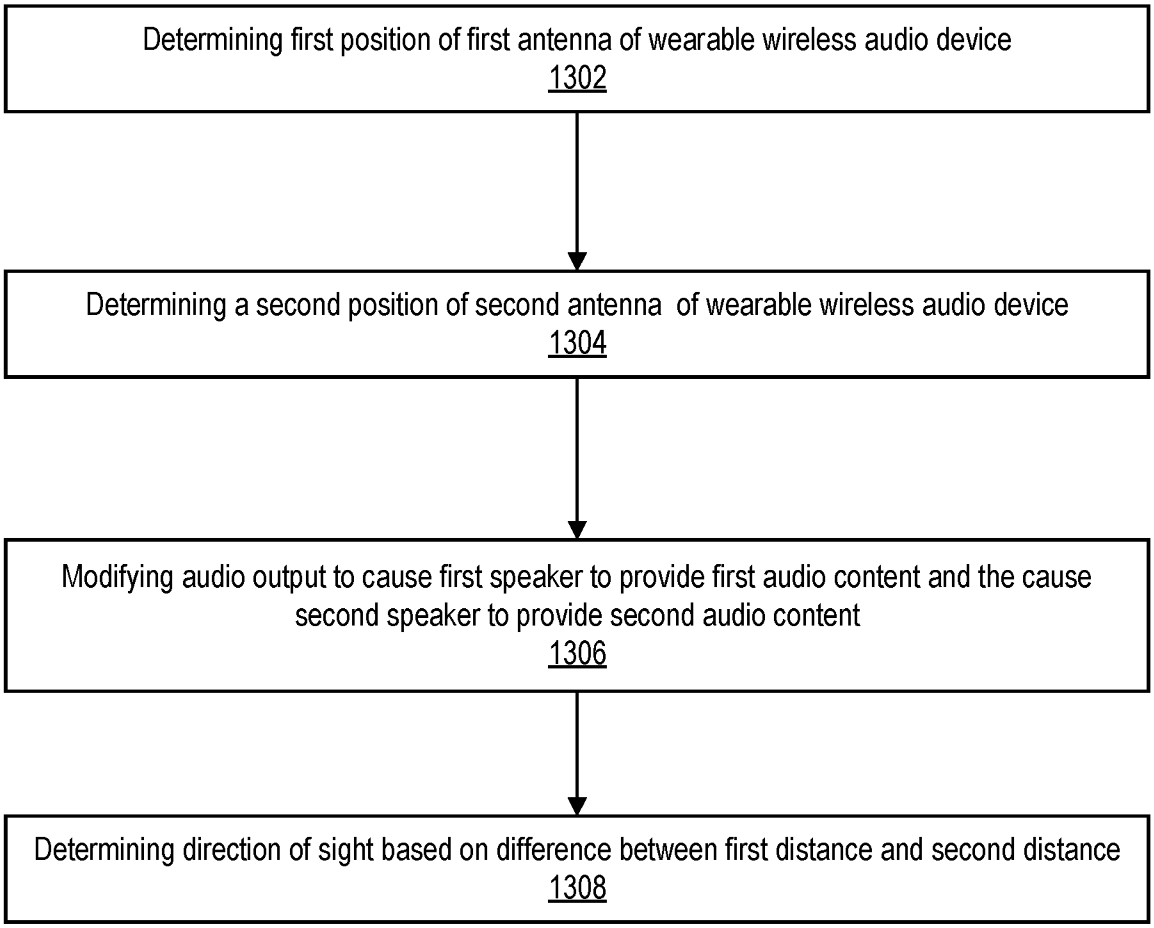

Reference is now made to FIG. 13, which is a schematic block diagram illustrating operations for methods for facilitating embodiments described herein. The operations 1300 may be performed by one or more processor circuits of one or more computing devices, such as any of the computing devices described herein, for example. The operations 800 may include determining (block 1302), by an EGM, a first position of a first antenna of a wearable wireless audio device relative to the EGM and determining (block 1304), by the EGM, a second position of a second antenna of the wearable wireless audio device, the second position being different from the first position. Operations may include modifying (block 1306) an audio output to cause a first speaker of the wearable wireless audio device to provide first audio content and to cause a second speaker of the wearable wireless audio device to provide a second audio content that is different from the first audio content. In some embodiments, the first position includes a first distance between the first antenna and the EGM. Some embodiments provide that the second position includes a second distance between the second antenna and the EGM that is different from the first distance. Operations may further include determining (block 1308) a direction of sight based on a difference between the first distance and the second distance.

Figure 14:
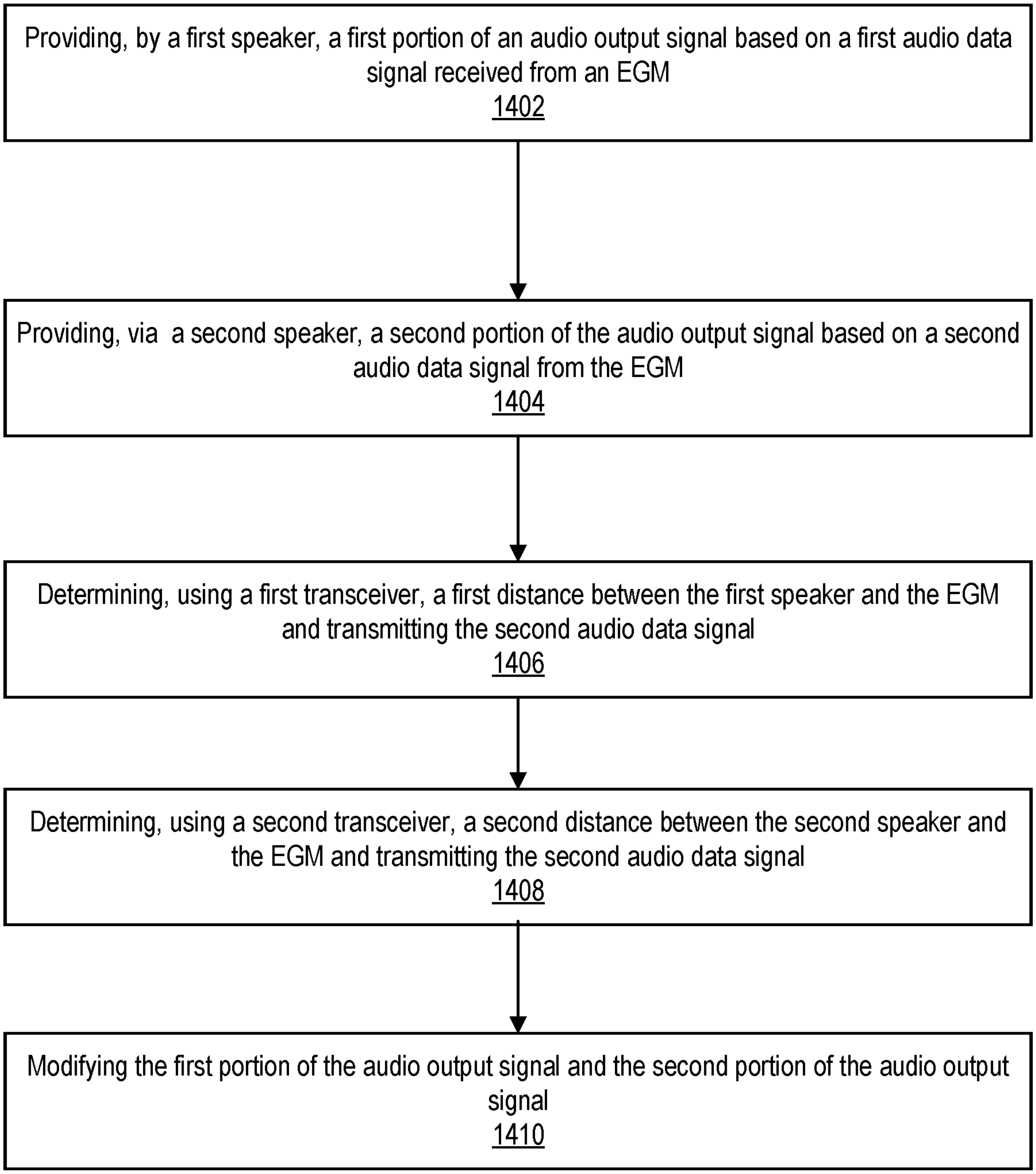

Reference is now made to FIG. 14, which is a schematic block diagram illustrating operations for systems, methods, and devices for facilitating embodiments described herein. Operations 1400 may be performed by one or more processor circuits of one or more computing devices, such as any of the computing devices described herein, for example. Some embodiments include a gaming device that includes a first speaker that provides (block 1302) a first portion of an audio output signal based on a first audio data signal received from an EGM. A second speaker provides (block 1404) a second portion of the audio output signal based on a second audio data signal from the EGM. A first transceiver is communicatively coupled to the EGM to determine (block 1406) a first distance between the first speaker and the EGM and to transmit the first audio data signal. A second transceiver is communicatively coupled to the EGM to determine (block 1408) a second distance between the second speaker and the EGM and to transmit the second audio data signal.

The gaming device may include a processor circuit and a memory including machine-readable instructions that, when executed by the processor circuit, cause the processor circuit to modify (block 1410) the first portion of the audio output signal and the second portion of the audio output signal based on the first distance and the second distance.

Embodiments described herein may be implemented in various configurations for gaming devices, including but not limited to: (1) a dedicated gaming device, wherein the computerized instructions for controlling any games (which are provided by the gaming device) are provided with the gaming device prior to delivery to a gaming establishment; and (2) a changeable gaming device, where the computerized instructions for controlling any games (which are provided by the gaming device) are downloadable to the gaming device through a data network when the gaming device is in a gaming establishment. In some embodiments, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In some embodiments, a gaming device may be operated by a mobile device, such as a mobile telephone, tablet other mobile computing device. For example, a mobile device may be communicatively coupled to a gaming device and may include a user interface that receives user inputs that are received to control the gaming device. The user inputs may be received by the gaming device via the mobile device.

In some embodiments, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more gaming devices; and/or (c) one or more personal gaming devices, such as desktop computers, laptop computers, tablet computers or computing devices, PDAs, mobile telephones such as smart phones, and other mobile computing devices.

In certain such embodiments, computerized instructions for controlling any games (such as any primary or base games and/or any secondary or bonus games) displayed by the gaming device are executed by the central server, central controller, or remote host. In such "thin client" embodiments, the central server, central controller, or remote host remotely controls any games (or other suitable interfaces) displayed by the gaming device, and the gaming device is utilized to display such games (or suitable interfaces) and to receive one or more inputs or commands. In other such embodiments, computerized instructions for controlling any games displayed by the gaming device are communicated from the central server, central controller, or remote host to the gaming device and are stored in at least one memory device of the gaming device. In such "thick client" embodiments, the at least one processor of the gaming device executes the computerized instructions to control any games (or other suitable interfaces) displayed by the gaming device.

In some embodiments in which the gaming system includes: (a) a gaming device configured to communicate with a central server, central controller, or remote host through a data network; and/or (b) a plurality of gaming devices configured to communicate with one another through a data network, the data network is an internet or an intranet. In certain such embodiments, an internet browser of the gaming device is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the gaming device, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the gaming device.

It should be appreciated that the central server, central controller, or remote host and the gaming device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of gaming devices to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product including one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency ("RF"), etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, Common Business Oriented Language ("COBOL") 2002, PHP: Hypertext Processor ("PHP"), Advanced Business Application Programming ("ABAP"), dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operations to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A system comprising:

a wearable wireless audio device that provides an audio output signal and that comprises a first speaker corresponding to a first antenna and a second speaker that is spaced apart from the first speaker and that corresponds to a second antenna;

a wireless communication interface that is wirelessly coupled to a remote device antenna of a remote device, the first antenna and the second antenna;

a processor circuit; and a memory comprising machine-readable instructions that, when executed by the processor circuit, cause the processor circuit to:

determine, based on communications between the first antenna and the remote device antenna, first position data of the first speaker relative to the remote device;

determine, based on communications between the second antenna and the remote device antenna, second position data of the second speaker relative to the remote device; and modify the audio output signal of the wearable wireless audio device based on the first position data and the second position data, wherein the first position data and the second position data indicate a user's direction of sight, and wherein, responsive to the user's direction of sight being directed at the remote device that comprises a display, the audio output signal is modified based on a visual content being displayed on the display.

2. The system of claim 1, wherein the first position data corresponds to a first distance from the first speaker to the remote device and the second position data corresponds to a second distance from the second speaker to the remote device, and wherein, in response to the first distance being greater than the second distance, a first speaker audio volume is greater than a second speaker audio volume.

3. The system of claim 1, wherein the first position data corresponds to a first distance from the first speaker to a virtual event occurring in the remote device and the second position data corresponds to a second distance from the second speaker to the virtual event occurring in the remote device, and wherein, in response to the first distance being greater than the second distance, a first speaker audio volume is greater than a second speaker audio volume.

4. The system of claim 1, wherein the first position data corresponds to a first distance from the first speaker to a virtual event occurring in the remote device and the second position data corresponds to a second distance from the second speaker to the virtual event occurring in the remote device, wherein, in response to the first distance being greater than the second distance, a first speaker audio effect is different from a second speaker audio effect.

5. The system of claim 1, wherein the first position data and the second position data correspond to a rotary angle of the wearable wireless audio device towards the remote device that is determined based on a difference between the first position data and the second position data, wherein, in response to an increase in the rotary angle, a difference between a first speaker volume of the first speaker and a second speaker volume of the second speaker is caused to increase.

6. The system of claim 1, wherein the first position data and the second position data each correspond to a height of the wearable wireless audio device and a height of a virtual object relative to a height of the remote device, wherein, in response to the height of the wearable wireless audio device being lower than the height of the remote device, the audio output signal of the first speaker and the second speaker is modified to cause the audio output signal to originate from a greater height than the height of the wearable wireless audio device, and wherein, in response to the height of the wearable wireless audio device being greater than the height of the remote device, the audio output signal of the first speaker and the second speaker is modified to cause the audio output signal to originate from a lower height than the height of the wearable wireless audio device.

7. The system of claim 1, wherein the remote device antenna comprises an electronic gaming machine (EGM) antenna that is wirelessly coupled to the wearable wireless audio device and that provides first audio data that determines an output of the first speaker and second audio data that determines an output of the second speaker.

8. The system of claim 7, wherein the EGM comprises a first EGM comprising a first EGM antenna and a second EGM comprising a second EGM antenna, wherein the processor circuit is further caused to:

determine, based on communications between the first antenna and the second EGM antenna, third position data of the first speaker relative to the second EGM;

determine, based on communications between the second antenna and the second EGM antenna, fourth position data of the second speaker relative to the second EGM; and modify the audio output signal of the wearable wireless audio device based on the first position data, the second position data, the third position data and the fourth position data.

9. The system of claim 8, wherein the wearable wireless audio device is further caused to receive data corresponding to the first EGM from the second EGM via wireless communication between the first EGM and the second EGM.

10. The system of claim 7, wherein the wearable wireless audio device comprises a first wearable wireless audio device that wirelessly communicates with the EGM and a second wearable wireless audio device that communicates with the EGM, wherein the processor circuit to modify the audio output signal is caused to modify the audio output signal of the first wearable wireless audio device based on the first position data and to modify the second wearable wireless audio device based on second position data that is different from the first position data.

11. The system of claim 1, wherein the remote device antenna comprises a plurality of remote antenna devices, wherein each of the plurality of wearable wireless audio devices provides location data to each of the remote device antennas, and wherein each of the plurality of wearable wireless audio devices receives audio output signal data from each of the remote device antennas.

12. The system of claim 1, further comprising a mobile terminal that is wirelessly coupled to the wearable wireless audio device and the remote device to provide data connectivity between the wearable wireless audio device and the remote device.

13. The system of claim 1, wherein the first position data and the second position data indicate a user's direction of sight, and wherein, responsive to the user's direction of sight being directed towards different ones of a plurality of visible zones, the processor circuit is further caused to modify the audio output signal to correspond with content in each of the plurality of visible zones.

14. The system of claim 1, wherein the remote device antenna comprises an EGM antenna that is wirelessly coupled to the wearable wireless audio device, wherein the remote device antenna further comprises an electronic table game (ETG) antenna that is wirelessly coupled to the wearable wireless audio device, and wherein the wearable wireless audio device is further caused to receive data corresponding to the ETG.

15. The system of claim 1, wherein the remote device comprises a plurality of EGMs that comprise a mesh network of EGMs, wherein, based on the first position data and the second position data corresponding to the wearable wireless audio device, the audio output signal is modified to comprise an invitation to play one of the plurality of EGMs.

16. The system of claim 1, wherein the processor circuit to modify the audio output is further caused to selectively provide active noise cancellation to one of the first speaker or the second speaker based on the first position data and the second position data.

17. A method comprising:

determining, by an EGM, a first position of a first antenna of a wearable wireless audio device relative to the EGM;

determining, by the EGM, a second position of a second antenna of the wearable wireless audio device, the second position being different from the first position;

modifying an audio output to cause a first speaker of the wearable wireless audio device to provide first audio content and to cause a second speaker of the wearable wireless audio device to provide a second audio content that is different from the first audio content, wherein the first position comprises a first distance between the first antenna and the EGM, wherein the second position comprises a second distance between the second antenna and the EGM that is different from the first distance; and determining a direction of sight based on a difference between the first distance and the second distance.

18. A gaming device comprising:

a first speaker that provides a first portion of an audio output signal based on a first audio data signal received from an EGM;

a second speaker that provides a second portion of the audio output signal based on a second audio data signal from the EGM;

a first transceiver that is communicatively coupled to the EGM to determine a first distance between the first speaker and the EGM and to transmit the first audio data signal;

a second transceiver that is communicatively coupled to the EGM to determine a second distance between the second speaker and the EGM and to transmit the second audio data signal;

a processor circuit; and a memory comprising machine-readable instructions that, when executed by the processor circuit, cause the processor circuit to modify the first portion of the audio output signal and the second portion of the audio output signal based on the first distance and the second distance, wherein the first position data and the second position data indicate a user's direction of sight, and wherein a bonus skill game comprises: providing the audio output signal that comprises a changing direction of sight and receiving a changed position of the wearable wireless audio device to be proximate the audio output signal, wherein responsive to the audio output signal corresponding to the changed position of the wearable wireless audio device, awarding a bonus prize.

* * * * *